United States Patent
Tolksdorf et al.

(10) Patent No.: US 10,892,701 B2
(45) Date of Patent: Jan. 12, 2021

(54) METHOD FOR OPERATING A DRIVE SYSTEM, AND DRIVE SYSTEM

(71) Applicant: Lenze Drives GmbH, Extertal (DE)

(72) Inventors: Andreas Tolksdorf, Hameln (DE); Dennis Steup, Aerzen (DE)

(73) Assignee: Lenze Drives GmbH, Extertal (DE)

( * ) Notice: Subject to any disclaimer, the term of this patent is extended or adjusted under 35 U.S.C. 154(b) by 0 days.

(21) Appl. No.: 16/472,387

(22) PCT Filed: Dec. 22, 2017

(86) PCT No.: PCT/EP2017/084316
§ 371 (c)(1),
(2) Date: Jun. 21, 2019

(87) PCT Pub. No.: WO2018/115406
PCT Pub. Date: Jun. 28, 2018

(65) Prior Publication Data
US 2019/0363662 A1  Nov. 28, 2019

(30) Foreign Application Priority Data
Dec. 23, 2016 (DE) .......... 10 2016 226 196

(51) Int. Cl.
*H02P 27/04* (2016.01)
*H02P 27/12* (2006.01)
(Continued)

(52) U.S. Cl.
CPC .......... *H02P 27/12* (2013.01); *H02P 21/10* (2013.01); *H02P 21/20* (2016.02); *H02P 21/22* (2016.02); *H02P 25/22* (2013.01); *H02P 2207/01* (2013.01)

(58) Field of Classification Search
CPC ......... H02P 27/12; H02P 27/10; H02P 27/048
(Continued)

(56) References Cited

U.S. PATENT DOCUMENTS 3,531,701 A * 9/1970 Shibata .......... H02K 17/42
318/45
5,200,659 A * 4/1993 Clarke .......... H02K 16/04
310/112

(Continued)

FOREIGN PATENT DOCUMENTS

DE  10 2013 208 544 A1  11/2014

OTHER PUBLICATIONS

International Search Report (PCT/ISA/210) issued in PCT Application No. PCT/EP2017/084316 dated Mar. 15, 2018 with English translation (seven pages).
German-language Written Opinion (PCT/ISA/237) issued in PCT Application No. PCT/EP2017/084316 dated Mar. 15, 2018 (five pages).
(Continued)

*Primary Examiner* — Erick D Glass
(74) *Attorney, Agent, or Firm* — Crowell & Moring LLP

(57) ABSTRACT

A drive system includes a three-phase motor having a shaft, a first three-phase stator winding which is to be connected to a three-phase AC voltage grid, a second three-phase stator winding which is to be connected to the three-phase AC voltage grid in such a way that a second stator rotating field rotating in opposition results with respect to a first stator rotating field which is generated by means of the first stator winding, and a rotor winding system which is mechanically coupled in a rotationally fixed manner to the shaft. The drive system further includes at least one inverter which is mechanically coupled in a rotationally fixed manner to the shaft and which is electrically coupled to the rotor winding system, wherein the at least one inverter is configured to generate actuation signals for the rotor winding system such that a first rotor rotating field and a second rotor rotating field rotating in opposition to the first rotor rotating field are generated. The at least one inverter is configured to generate the actuation signals for the rotor winding system solely depending on signals detected on the rotor side.

5 Claims, 7 Drawing Sheets

(51) Int. Cl.
*H02P 21/20* (2016.01)
*H02P 21/22* (2016.01)
*H02P 21/10* (2016.01)
*H02P 25/22* (2006.01)

(58) Field of Classification Search
USPC ......................................................... 318/801
See application file for complete search history.

(56) References Cited

U.S. PATENT DOCUMENTS

| 10,263,557 | B2 | 4/2019 | Tolksdorf | |
|---|---|---|---|---|
| 2005/0007044 | A1* | 1/2005 | Qiu | H02P 21/13 |
| | | | | 318/400.02 |
| 2005/0099083 | A1 | 5/2005 | Hsu | |
| 2012/0007459 | A1* | 1/2012 | Mondal | H02K 17/44 |
| | | | | 310/185 |
| 2017/0126161 | A1* | 5/2017 | Hijikata | H02K 1/2706 |
| 2017/0170765 | A1* | 6/2017 | Blackwelder | H02P 9/08 |

OTHER PUBLICATIONS

Zhu et al., "Study on Speed Sensorless Control of Brushless Doubly-Fed Wind Power Generator Based on Flux Linkage of the Power Winding", IEEE 7th International Power Electronics and Motion Control Conference, Jun. 2-5, 2012, pp. 2453-2456, four pages.

Shao et al., "Dynamic Control of the Brushless Doubly Fed Induction Generator Under Unbalanced Operation", IEEE Transactions on Industrial Electronics, Jun. 2013, pp. 2465-2476, vol. 60, No. 6, 12 pages.

Smith, "Synchronous Behavior of Doubly Fed Twin Stator Induction Machine, IEEE Transactions on Power Apparatus and Systems", Oct. 1, 1967, pp. 1227-1236, vol. 82, No. 10, XP011159525, 10 pages.

Hashemnia et al., "Experimental Investigations on the Core Loss Effects in an Inverter Fed Brushless Doubly Fed Machine", 39th Annual Conference of the IEEE Industrial Electronics Society, Nov. 10, 2013, pp. 2821-2826, XP032539542, six pages.

* cited by examiner

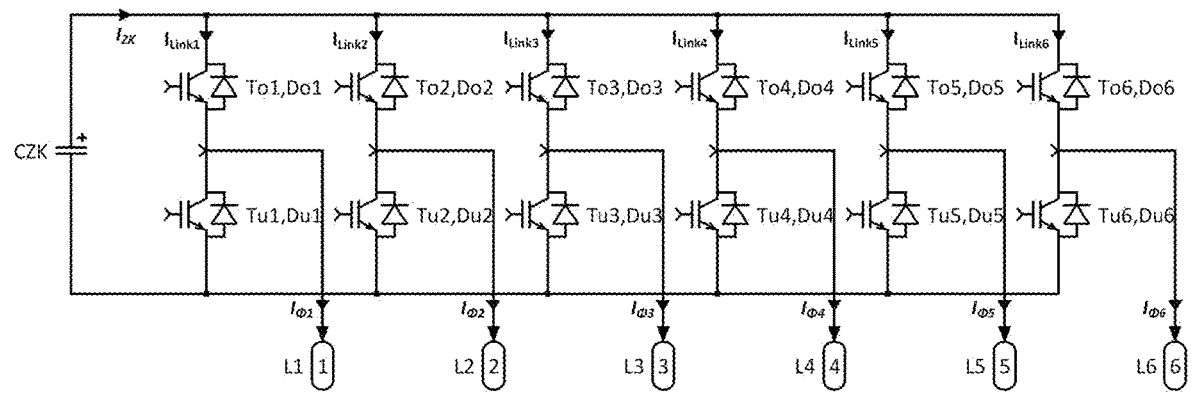
Fig. 2: Counting direction and designation of the inverter currents
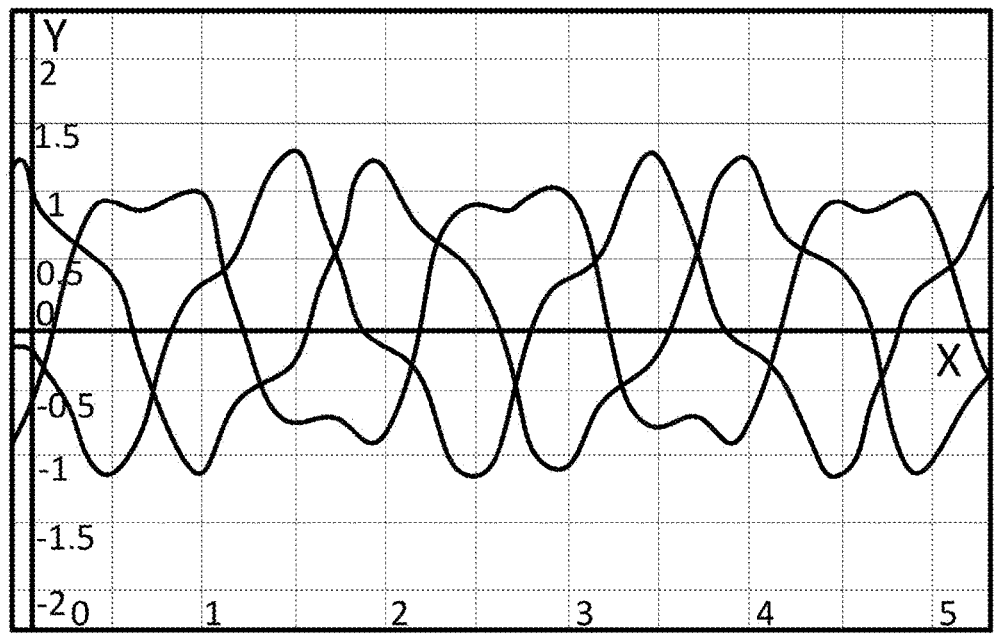
Fig. 3: Example: 3-phase, asymmetrical current system

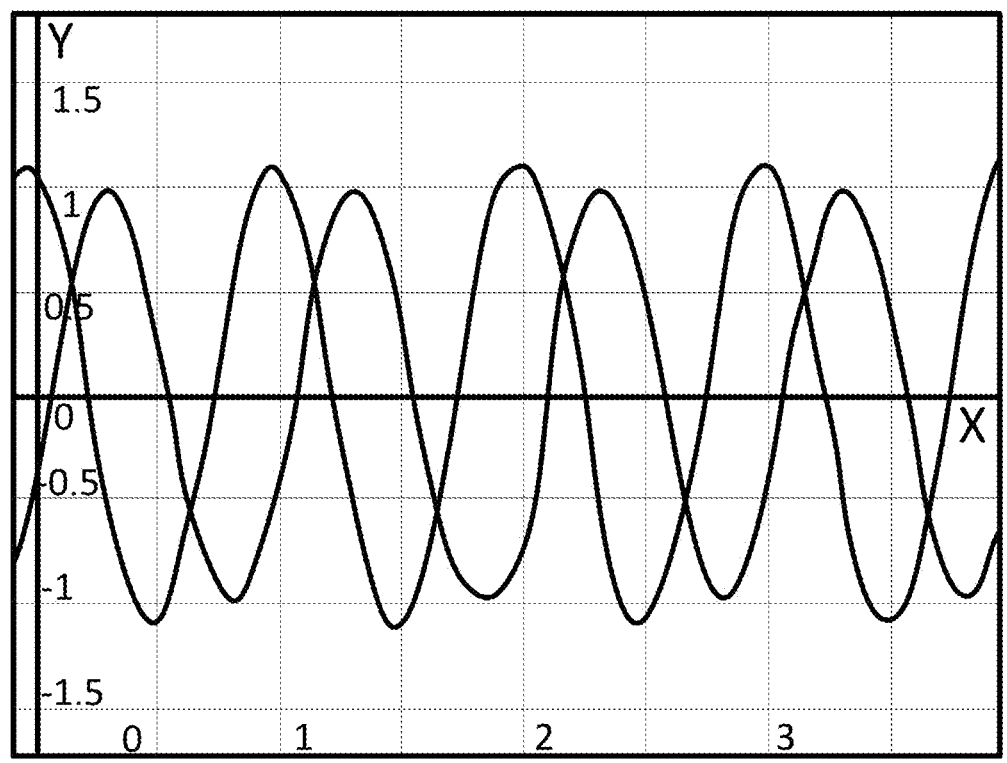
Fig. 4
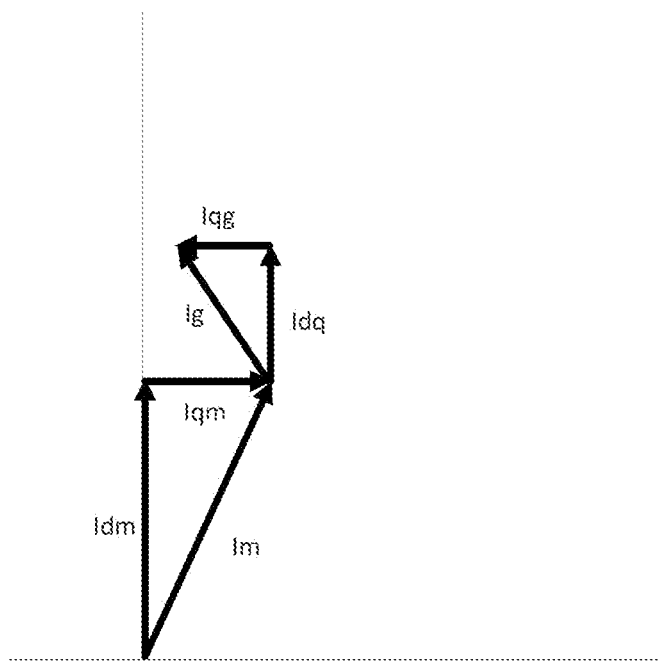
Fig. 5: Position of the current components with respect to the reference system

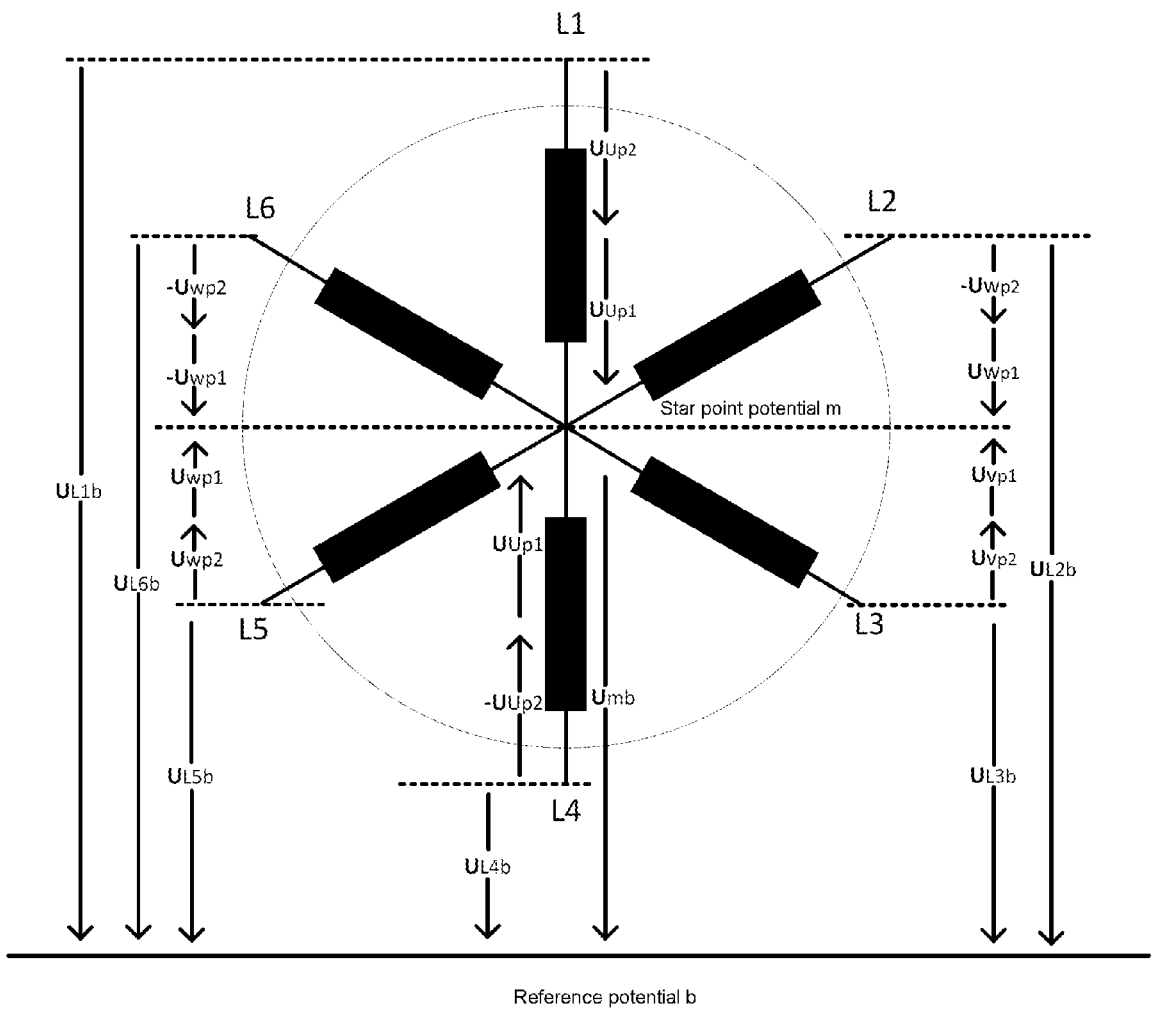
Fig. 6: Voltage system on the rotor

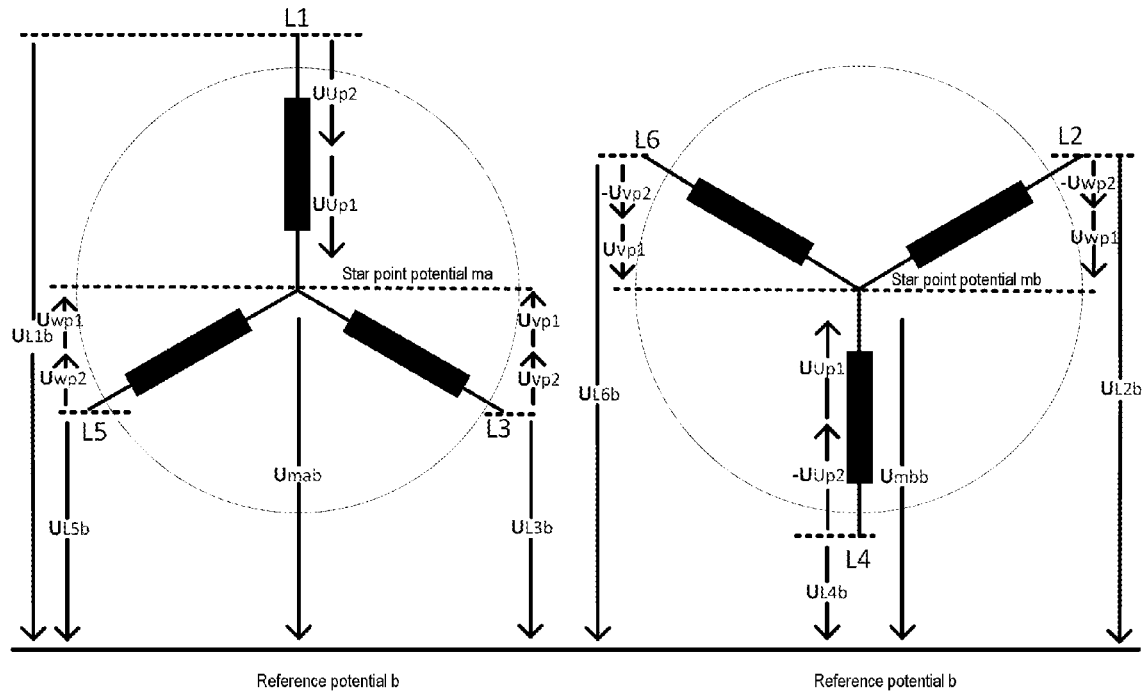
Fig. 7: Voltage system on the rotor with separated star points
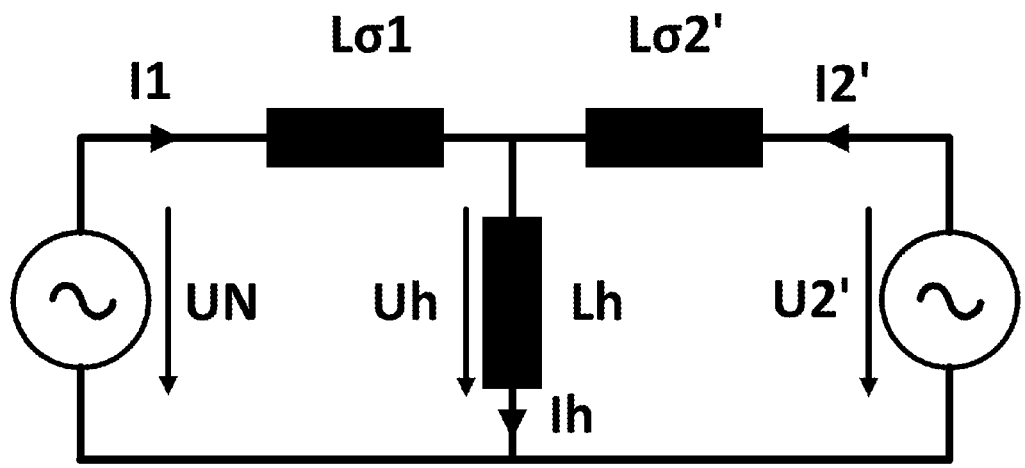
Fig. 8: Equivalent circuit diagram for determining the load angle (without taking into account resistive losses)

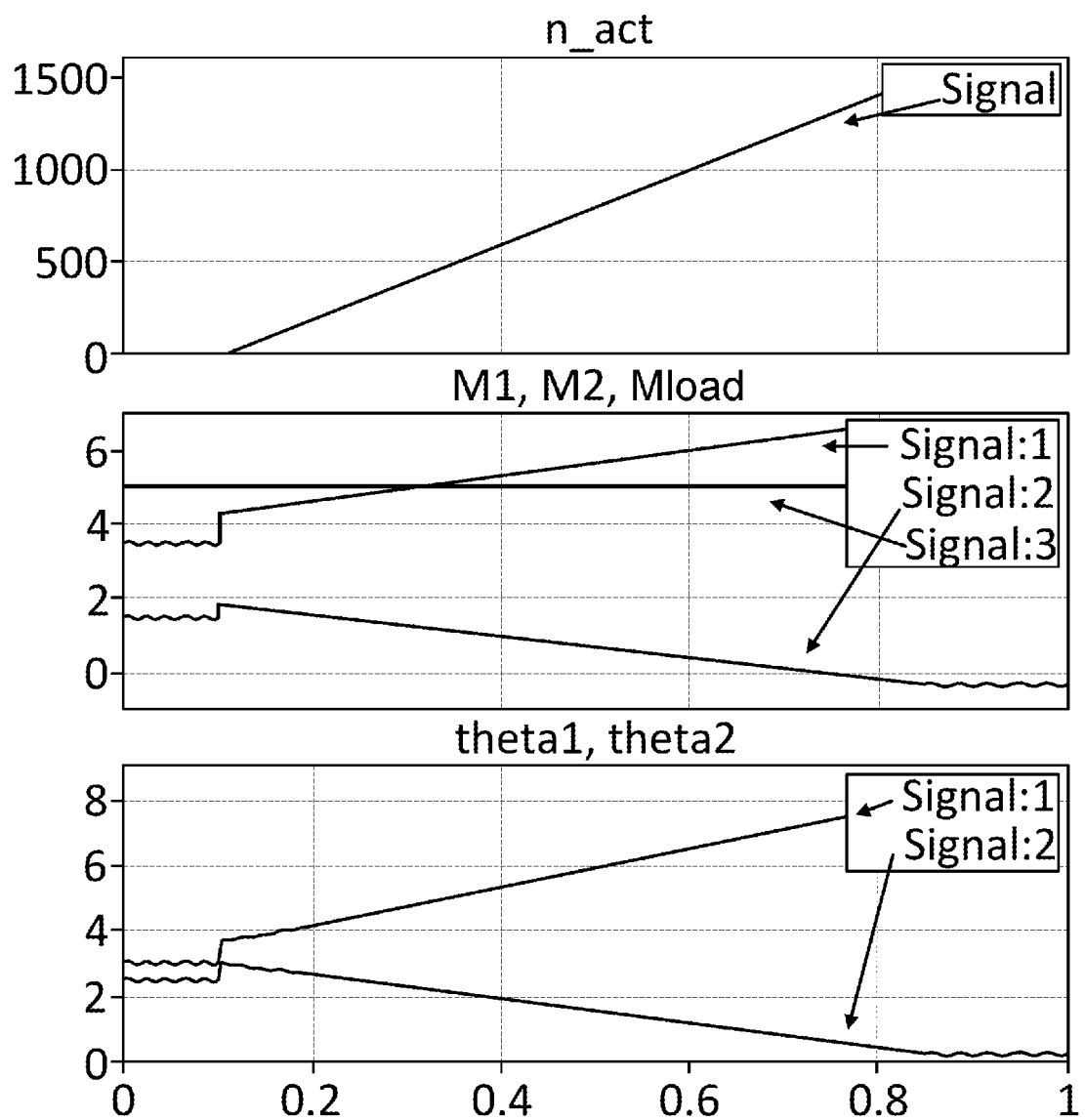
Fig. 9: Load angles $\vartheta_{load1,2}$ (scaled in°) with respect to t during acceleration under constant load

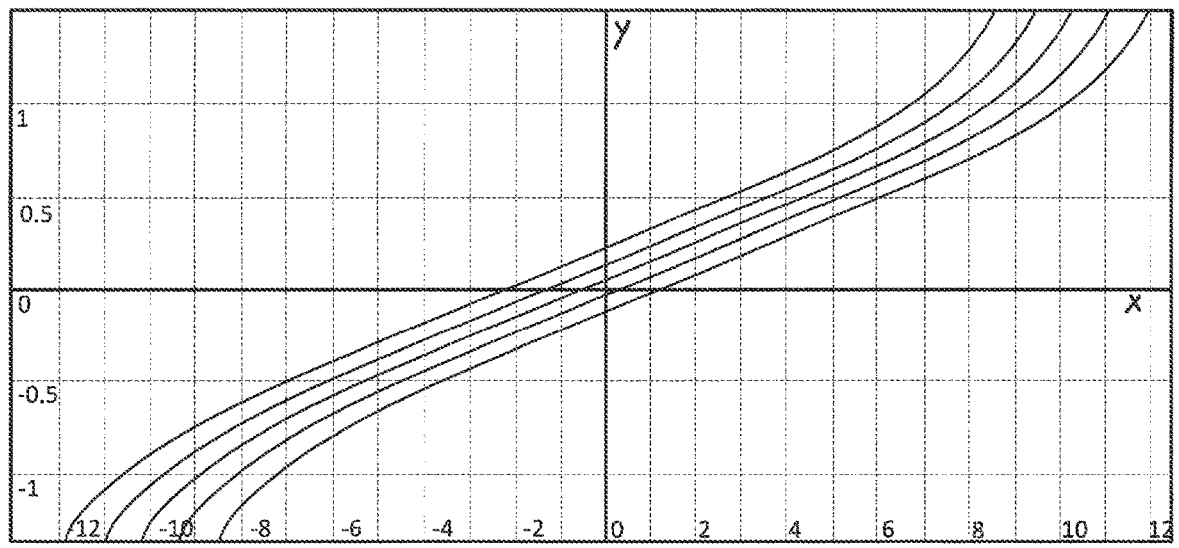
Fig. 10: Profile of the load angle $\vartheta_{load}$ depending on active current based on $I_{h0}$

METHOD FOR OPERATING A DRIVE SYSTEM, AND DRIVE SYSTEM

BACKGROUND AND SUMMARY OF THE INVENTION

The invention relates to a method for operating a drive system, and to a drive system.

DE 10 2013 208 544 A1 describes a drive system comprising a three-phase motor and at least one inverter. The three-phase motor has a shaft, a first three-phase stator winding, a second three-phase stator winding and a rotor winding system. The first three-phase stator winding is connected to a three-phase AC voltage grid. The second three-phase stator winding is connected to the three-phase AC voltage grid in such a way that a second stator rotating field rotating in opposition results with respect to a first stator rotating field which is generated by means of the first stator winding. The rotor winding system is mechanically coupled in a rotationally fixed manner to the shaft. The drive system further has at least one inverter which is mechanically coupled in a rotationally fixed manner to the shaft and which is electrically coupled to the rotor winding system. The at least one inverter is designed to generate actuation signals for the rotor winding system in such a way that a first rotor rotating field and a second rotor rotating field rotating in opposition to the first rotor rotating field are generated.

The object of the invention is to provide a method for operating a drive system and a drive system which allow reliable operation of the drive system.

The invention achieves the object by way of a method for operating a drive system and a drive system in accordance with the claimed invention.

The method serves to operate a drive system as is described in respect of its basic construction in DE 10 2013 208 544 A1 for example. The drive system has a three-phase motor and at least one inverter. The three-phase motor has a shaft, a first three-phase stator winding, a second three-phase stator winding and a rotor winding system. The first three-phase stator winding is connected to a three-phase AC voltage grid. The second three-phase stator winding is connected to the three-phase AC voltage grid in such a way that a second stator rotating field rotating in opposition results with respect to a first stator rotating field which is generated by means of the first stator winding. The rotor winding system is mechanically coupled in a rotationally fixed manner to the shaft. The drive system further has at least one inverter which is mechanically coupled in a rotationally fixed manner to the shaft and which is electrically coupled to the rotor winding system. The at least one inverter is designed to generate actuation signals for the rotor winding system in such a way that a first rotor rotating field and a second rotor rotating field rotating in opposition to the first rotor rotating field are generated. The actuation signals can be, for example, actuation voltages or actuation currents.

The actuation signals for the rotor winding system are generated solely depending on signals detected on the rotor side.

According to the invention, in the drive system with rotor-side drive electronics, the variables required for control purposes are ascertained solely by means of a sensor system, which is arranged on the rotor side, in order to avoid transmission of time-critical measurement variables from the stator side to the rotor side.

The signals detected on the rotor side can comprise or be phase current signals (phase currents) of the rotor winding system.

The phase current signals detected on the rotor side can be divided by calculation into first components, which belong to the first rotor rotating field, and into second components, which belong to the second rotor rotating field.

The phase current signals which are associated with the first rotor rotating field and with the second rotor rotating field can be divided by calculation into symmetrical components with co-rotating and counter-rotating components given an asymmetrical time profile of the three-phase AC voltage grid.

A first load angle, which belongs to the first rotor rotating field, can be calculated from the divided phase current signals, a second load angle, which belongs to the second rotor rotating field, can be calculated from the divided phase current signals, and an actual grid voltage angle and/or an instantaneous rotor position can be ascertained based on the first load angle and the second load angle.

The signals detected on the rotor side can further comprise rotor voltages of the rotor winding system, wherein the rotor voltages of the rotor winding system are measured in a zero-current state of the rotor winding system, wherein values of an instantaneous grid voltage amplitude, and/or of an instantaneous grid frequency, and/or of an instantaneous rotor rotation speed and/or of an instantaneous rotor position angle are ascertained based on a time profile of the rotor voltages.

The drive system according to the invention has a three-phase motor and at least one inverter. The three-phase motor has a shaft, a first three-phase stator winding, a second three-phase stator winding and a rotor winding system. The first three-phase stator winding is connected to a three-phase AC voltage grid. The second three-phase stator winding is connected to the three-phase AC voltage grid in such a way that a second stator rotating field rotating in opposition results with respect to a first stator rotating field, which is generated by means of the first stator winding. The rotor winding system is mechanically coupled in a rotationally fixed manner to the shaft. The drive system further has at least one, in particular precisely one, inverter which is mechanically coupled in a rotationally fixed manner to the shaft and which is electrically coupled to the rotor winding system. The at least one inverter is designed to generate actuation signals for the rotor winding system in such a way that a first rotor rotating field and a second rotor rotating field rotating in opposition to the first rotor rotating field are generated. The inverter is designed to generate the actuation signals for the rotor winding system solely depending on signals detected on the rotor side.

The drive system or the inverter can have a signal detection device which is designed to detect the rotor-side signals.

BRIEF DESCRIPTION OF THE DRAWINGS

The invention will be described in detail below with reference to the drawings, in which:

FIG. 2 shows a counting direction and a designation of inverter currents, FIG. 3 shows an example of a three-phase asymmetrical current system, FIG. 4 shows various signal profiles, FIG. 5 shows a position of current components with respect to a reference system, FIG. 6 shows a voltage system on a rotor, FIG. 7 shows a voltage system on a rotor with separated star points, FIG. 8 shows an equivalent circuit diagram for determining the load angle without taking into account resistive losses, FIG. 9 shows load angles with respect to time during acceleration under constant load, and FIG. 10 shows a profile of a load angle.

DETAILED DESCRIPTION OF THE DRAWINGS

Figure 1:
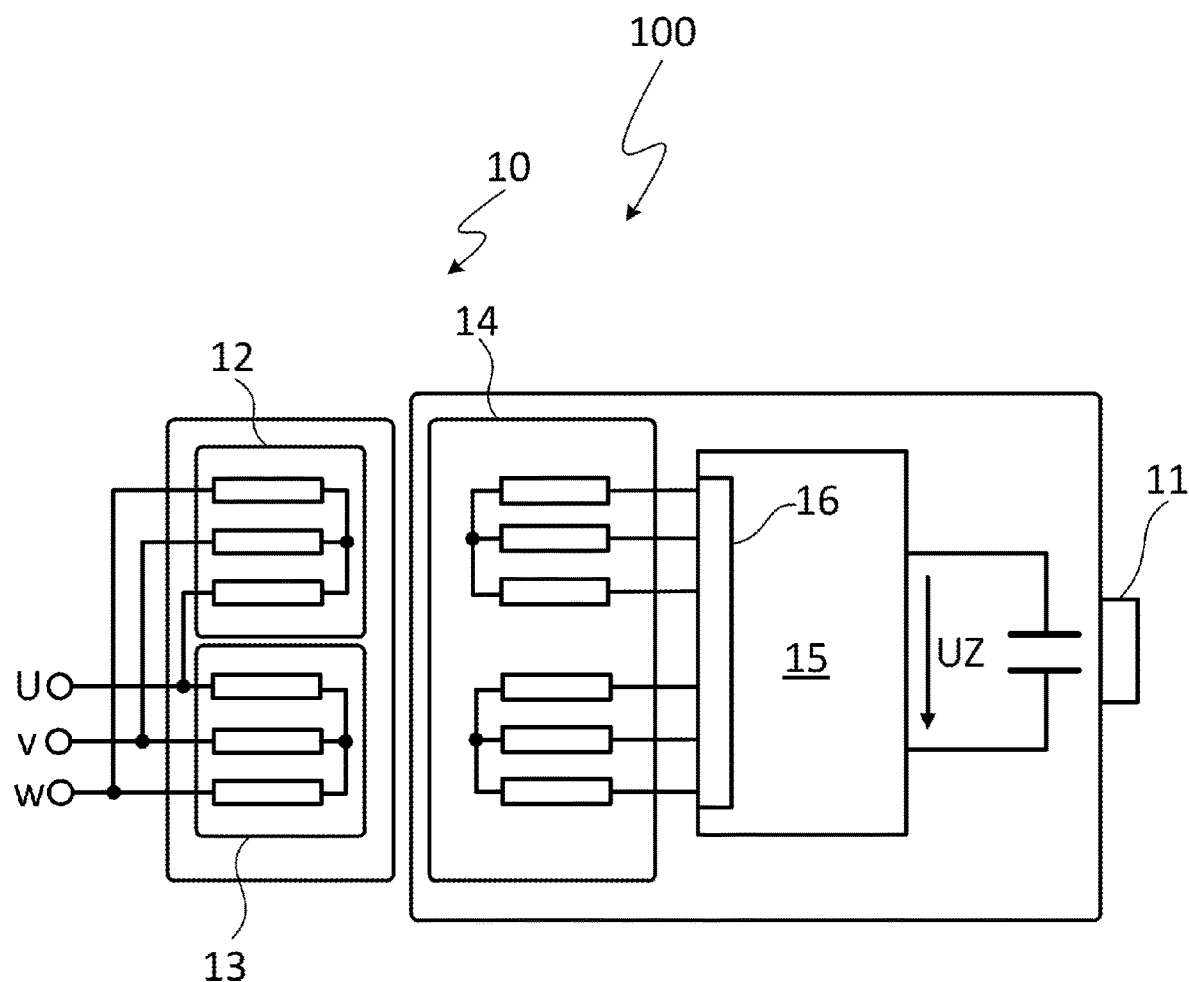
FIG. 1 shows, in a highly schematic manner, a drive system comprising a three-phase motor and a rotor-side inverter.

FIG. 1 shows, in a highly schematic manner, a drive system 100 comprising a three-phase motor 10 and a rotor-side inverter 15.

The three-phase motor 10 has a schematically illustrated shaft 11, a first three-phase stator winding 12 which is connected to a three-phase AC voltage grid U, V, W, a second three-phase stator winding 13 which is to be connected to the three-phase AC voltage grid in such a way that a second stator rotating field rotating in opposition results with respect to a first stator rotating field which is generated by means of the first stator winding 12, and a rotor winding system 14 which is mechanically coupled in a rotationally fixed manner to the shaft 11.

The inverter 15 is mechanically coupled in a rotationally fixed manner to the shaft 11 and electrically coupled to the rotor winding system 14. The at least one inverter 15 is designed to generate actuation signals for the rotor winding system 15 in such a way that a first rotor rotating field and a second rotor rotating field rotating in opposition to the first rotor rotating field are generated.

The inverter 15 has a signal detection device 16 which is designed to detect rotor-side signals which are required for operating the drive system 100.

The inverter 15 is designed to generate the actuation signals for the rotor winding system 14 solely depending on the signals detected on the rotor side by means of the signal detection device 16.

There now follows as part of the present description a chapter 5.3 which describes the detection of the rotor-side signals in detail.

Chapter 5.3.1 describes how the phase current signals detected on the rotor side are divided by calculation into first components, which belong to the first rotor rotating field, and into second components, which belong to the second rotor rotating field.

Chapter 5.3.2 describes how the phase current signals which are associated with the first rotor rotating field and with the second rotor rotating field by means of the division by calculation are divided by calculation into symmetrical components with co-rotating and counter-rotating components given an asymmetrical time profile of the three-phase AC voltage grid.

Chapter 5.3.5 describes how rotor voltages of the rotor winding system are measured in a zero-current state of the rotor winding system, wherein values of an instantaneous grid voltage amplitude, and/or of an instantaneous grid frequency, and/or of an instantaneous rotor rotation speed and/or of an instantaneous rotor position angle are ascertained based on a time profile of the rotor voltages.

Chapter 5.3.6 describes how a first load angle, which belongs to the first rotor rotating field, is calculated from the divided phase current signals, a second load angle, which belongs to the second rotor rotating field, is calculated from the divided phase current signals, and an actual grid voltage angle and/or an instantaneous rotor position is/are ascertained based on the first load angle and the second load angle.

5.3 Ascertaining the Variables Required for Controlling the System 5.3.1 Separating the Measured Rotor Currents into the Components Associated with Partial Motors In order to control the machine, the phase currents of all six inverter phases can be provided as measurement signals. Each phase current contains components of both subsystems, and for this reason it is necessary to separate the measured variables into these components for further use in the control arrangement.

FIG. 2 shows the counting directions of the variables used below.

Analogously to breaking down asymmetrical three-phase variables into their positive sequence, negative sequence and zero sequence components [28], it is also possible in a 6-phase system with fields with an unequal number of pole pairs moving toward one another to break these down into their individual components. For the system present here where $p_2/p_1=\frac{1}{2}$, the positive sequence, negative sequence and zero sequence components result therefrom separately for each of the two fields, giving a total of six components. The complex phase shifter $$\underline{a} = e^{j\frac{2}{3}\pi},$$

as is customary when determining symmetrical components, is used for this purpose.

In the six phase currents, the components of the $p_1$- and $p_2$-pole currents are superimposed both by their positive sequence and negative sequence components. A 0 sequence component is non-existent since this system does not contain a neutral conductor which could lead to a current of this kind. The following equation system describes the phase currents:

$$\begin{pmatrix} I_{\phi 1} \\ I_{\phi 2} \\ I_{\phi 3} \\ I_{\phi 4} \\ I_{\phi 5} \\ I_{\phi 6} \end{pmatrix} = \begin{pmatrix} 1 & 1 & 1 & 1 \\ \underline{a}^2 & \underline{a} & -\underline{a} & -\underline{a}^2 \\ \underline{a} & \underline{a}^2 & \underline{a}^2 & \underline{a} \\ 1 & 1 & -1 & -1 \\ \underline{a}^2 & \underline{a} & \underline{a} & \underline{a}^2 \\ \underline{a} & \underline{a}^2 & -\underline{a}^2 & -\underline{a} \end{pmatrix} \begin{pmatrix} I_{p1m} \\ I_{p1g} \\ I_{p2m} \\ I_{p2g} \end{pmatrix} \quad (5.32)$$

Adding and subtracting respectively opposite phases gives the following:

$$\begin{pmatrix} I_{\phi 1} + I_{\phi 4} \\ I_{\phi 2} + I_{\phi 6} \\ I_{\phi 3} + I_{\phi 2} \\ I_{\phi 1} + I_{\phi 4} \\ I_{\phi 2} + I_{\phi 6} \\ I_{\phi 3} + I_{\phi 2} \end{pmatrix} = 2 \begin{pmatrix} 1 & 1 & 0 & 0 \\ \underline{a}^2 & \underline{a} & 0 & 0 \\ \underline{a} & \underline{a}^2 & 0 & 0 \\ 0 & 0 & 1 & 1 \\ 0 & 0 & \underline{a}^2 & \underline{a} \\ 0 & 0 & \underline{a} & \underline{a}^2 \end{pmatrix} \begin{pmatrix} I_{p1m} \\ I_{p1g} \\ I_{p2m} \\ I_{p2g} \end{pmatrix} \quad (5.33)$$

The determining equations of the phase currents, ascertained by calculation, of the two three-phase systems can be extracted from the above:

$$I_{p1} = \begin{pmatrix} \underline{I}_{Up1} \\ \underline{I}_{Vp1} \\ \underline{I}_{Wp1} \end{pmatrix} = \begin{pmatrix} I_{\phi1} + I_{\phi4} \\ I_{\phi3} + I_{\phi6} \\ I_{\phi5} + I_{\phi2} \end{pmatrix} = 2 \begin{pmatrix} 1 & 1 \\ a^2 & a \\ a & a^2 \end{pmatrix} \begin{pmatrix} \underline{I}_{p1m} \\ \underline{I}_{p1g} \end{pmatrix} \quad (5.34)$$

$$I_{p2} = \begin{pmatrix} \underline{I}_{Up2} \\ \underline{I}_{Vp2} \\ \underline{I}_{Wp2} \end{pmatrix} = \begin{pmatrix} I_{\phi1} + I_{\phi4} \\ I_{\phi3} + I_{\phi6} \\ I_{\phi5} + I_{\phi2} \end{pmatrix} = 2 \begin{pmatrix} 1 & 1 \\ a^2 & a \\ a & a^2 \end{pmatrix} \begin{pmatrix} \underline{I}_{p2m} \\ \underline{I}_{p2g} \end{pmatrix} \quad (5.35)$$

It is clear from equation 5.34 and equation 5.35 that the sum of the currents of opposite phases corresponds to the current to be ascertained of a three-phase $p_1$-pole system and that the difference between the currents of opposite phases corresponds to the current to be ascertained of a three-phase $p_2$-pole system. The respective positive sequence and negative sequence components are contained in the sums and differences.

In the inverter phases, the instantaneous values of the current can be measured as real parts of the components of the vectors $\underline{I}_{p1}$ and $\underline{I}_{p2}$. This gives $$I_{p1} = \begin{pmatrix} \mathrm{Re}(\underline{I}_{Up1}) \\ \mathrm{Re}(\underline{I}_{Vp1}) \\ \mathrm{Re}(\underline{I}_{Wp1}) \end{pmatrix} = \begin{pmatrix} \mathrm{Re}(I_{\phi1}) + \mathrm{Re}(I_{\phi4}) \\ \mathrm{Re}(I_{\phi3}) + \mathrm{Re}(I_{\phi6}) \\ \mathrm{Re}(I_{\phi5}) + \mathrm{Re}(I_{\phi2}) \end{pmatrix}$$
$$= 2 \begin{pmatrix} \mathrm{Re}(\underline{I}_{p1m}) \\ \mathrm{Re}(a^2 \underline{I}_{p1m}) \\ \mathrm{Re}(a \underline{I}_{p1m}) \end{pmatrix} + 2 \begin{pmatrix} \mathrm{Re}(\underline{I}_{p1g}) \\ \mathrm{Re}(a \underline{I}_{p1g}) \\ \mathrm{Re}(a^2 \underline{I}_{p1g}) \end{pmatrix} \quad (5.36)$$

and $$I_{p2} = \begin{pmatrix} \mathrm{Re}(\underline{I}_{Up2}) \\ \mathrm{Re}(\underline{I}_{Vp2}) \\ \mathrm{Re}(\underline{I}_{Wp2}) \end{pmatrix} = \begin{pmatrix} \mathrm{Re}(I_{\phi1}) + \mathrm{Re}(I_{\phi4}) \\ \mathrm{Re}(I_{\phi3}) + \mathrm{Re}(I_{\phi6}) \\ \mathrm{Re}(I_{\phi5}) + \mathrm{Re}(I_{\phi2}) \end{pmatrix}$$
$$= 2 \begin{pmatrix} \mathrm{Re}(\underline{I}_{p2m}) \\ \mathrm{Re}(a \underline{I}_{p2m}) \\ \mathrm{Re}(a^2 \underline{I}_{p2m}) \end{pmatrix} + 2 \begin{pmatrix} \mathrm{Re}(\underline{I}_{p2g}) \\ \mathrm{Re}(a^2 \underline{I}_{p2g}) \\ \mathrm{Re}(a \underline{I}_{p2g}) \end{pmatrix} \quad (5.37)$$

The phase currents ascertained from the measurable currents of the inverter and to be associated with the subsystems then have the profile $$i_{p1}(\omega_N t, s_1) = \begin{pmatrix} i_{Up1}(\omega_N t, s_1) \\ i_{Vp1}(\omega_N t, s_1) \\ i_{Wp1}(\omega_N t, s_1) \end{pmatrix} = \quad (5.38)$$
$$\begin{pmatrix} i_{\phi1}(\omega_N t, s_1) + i_{\phi4}(\omega_N t, s_1) \\ i_{\phi3}(\omega_N t, s_1) + i_{\phi6}(\omega_N t, s_1) \\ i_{\phi5}(\omega_N t, s_1) + i_{\phi2}(\omega_N t, s_1) \end{pmatrix}$$
$$= 2I_{p1m} \begin{pmatrix} \cos(\omega_N t, s_1 + \varphi_{p1m}) \\ \cos\left(\omega_N t, s_1 + \varphi_{p1m} - \frac{2}{3}\pi\right) \\ \cos\left(\omega_N t, s_1 + \varphi_{p1m} + \frac{2}{3}\pi\right) \end{pmatrix} +$$
$$2I_{p1g} \begin{pmatrix} \cos(\omega_N t(2 - s_1) + \varphi_{p1g}) \\ \cos\left(\omega_N t(2 - s_1) + \varphi_{p1g} + \frac{2}{3}\pi\right) \\ \cos\left(\omega_N t(2 - s_1) + \varphi_{p1g} - \frac{2}{3}\pi\right) \end{pmatrix}$$

and $$i_{p2}(\omega_N t, s_2) = \begin{pmatrix} i_{Up2}(\omega_N t, s_2)) \\ i_{Vp2}(\omega_N t, s_2)) \\ i_{Wp2}(\omega_N t, s_2)) \end{pmatrix} = \quad (5.39)$$
$$\begin{pmatrix} i_{\phi1}(\omega_N t, s_2)) + i_{\phi4}(\omega_N t, s_2)) \\ i_{\phi3}(\omega_N t, s_2)) + i_{\phi6}(\omega_N t, s_2)) \\ i_{\phi5}(\omega_N t, s_2)) + i_{\phi2}(\omega_N t, s_2)) \end{pmatrix}$$
$$= 2I_{p2m} \begin{pmatrix} \cos(\omega_N t, s_2 + \varphi_{p2m}) \\ \cos\left(\omega_N t, s_2 + \varphi_{p2m} - \frac{2}{3}\pi\right) \\ \cos\left(\omega_N t, s_2 + \varphi_{p2m} + \frac{2}{3}\pi\right) \end{pmatrix} +$$
$$2I_{p2g} \begin{pmatrix} \cos(\omega_N t(2 - s_2) + \varphi_{p2g}) \\ \cos\left(\omega_N t(2 - s_2) + \varphi_{p2g} + \frac{2}{3}\pi\right) \\ \cos\left(\omega_N t(2 - s_2) + \varphi_{p2g} - \frac{2}{3}\pi\right) \end{pmatrix}$$

It can also be seen here that, in a symmetrical three-phase system, the positive sequence component of the currents to be associated with the subsystems can be obtained directly by adding and subtracting the opposite phase currents.

If a symmetrical system is not present, the positive sequence and negative sequence components are intended to be ascertained separately. Methods for this are presented below.

5.3.2 Symmetrical Components in the Case of Asymmetrical Currents

It cannot generally be assumed that the grid voltage connected to the motor is symmetrical. Experience has shown that asymmetry of the grid phase voltages also leads to asymmetry of the variables which can be observed on the rotor side, such as the currents for example. Methods in respect of how the symmetrical components of the associated system can be ascertained from measurable instantaneous values of a variable are presented in [14, 15, 16, 9]. Algorithms for filtering harmonics from the measurement variables are also mentioned there. However, these algorithms require a high level of expenditure on computational power, in particular, if actual values are intended to be generated in the time interval which corresponds to the cycle time of a targeted motor control operation.

The way in which the respective symmetrical components can be ascertained from currents associated with the $p_1$ and $p_2$-pole fields, as shown in subsection 5.3.1, is described below. The objective of the method presented here is to ensure detection of said components as quickly as possible in order to provide variables with a high level of dynamics for controlling the system. The embodiments are intended to be used both for the $p_1$-pole variables and for the $p_2$-pole variables. Indexing of the numbers of pole pairs has been dispensed with in the equations below.

In a three-phase system of any desired asymmetry, the phase currents are made up of the positive sequence and negative sequence components and also the zero sequence component. In the text which follows, it is assumed that the zero sequence component is not present on account of the lack of a neutral conductor.

The co- and counter-rotating currents of the system rotating at $\omega_N(1-s)$ which are established on the rotor can then be written as $$\underline{i}_m(\omega_N t, s) = I_m \cdot e^{i \cdot (\omega_N t \cdot s + \varphi_m)} \quad (5.40)$$

$$\underline{i}_g(\omega_N t, s) = I_g \cdot e^{i \cdot (\omega_N t(2-s) + \varphi_q)} \quad (5.41)$$

The asymmetrical 3-phase current system is described by $$i_\phi(\omega_N t, s) = \begin{pmatrix} i_U \\ i_V \\ i_W \end{pmatrix} = i_m(\omega_N t, s) \cdot \begin{pmatrix} 1 \\ a^2 \\ a \end{pmatrix} + i_g(\omega_N t, s) \cdot \begin{pmatrix} 1 \\ a \\ a^2 \end{pmatrix} \quad (5.42)$$

The real parts of the phase currents can be detected by measurement $$i_\phi(\omega_N t, s) = \begin{pmatrix} \mathrm{Re}(i_U(\omega_N t, s)) \\ \mathrm{Re}(i_V(\omega_N t, s)) \\ \mathrm{Re}(i_W(\omega_N t, s)) \end{pmatrix} \quad (5.43)$$

By way of example, FIG. 3 shows the time profile of an assumed asymmetrical current system $$\hat{i}_m = 1,\ \hat{i}_g = 0.25,\ \varphi_m = 0,\ \varphi_g = \frac{\pi \cdot 5}{12}$$

and s=0.5 are selected.

If $i_\phi$ is transformed by the electrical angle of the system $\omega_m t$ (s), the grid-frequency $\alpha$, $\beta$ components:

$$i_{\alpha\beta}(\omega_N t, s) = \begin{pmatrix} i_\alpha(\omega_N t, s) \\ i_\beta(\omega_N t, s) \end{pmatrix}$$

$$= \frac{2}{3} \cdot \begin{pmatrix} \cos(-\omega_m t) & \cos\left(-\omega_m t - \frac{2\pi}{3}\right) & \cos\left(-\omega_m t + \frac{2\pi}{3}\right) \\ \sin(-\omega_m t) & \sin\left(-\omega_m t - \frac{2\pi}{3}\right) & \sin\left(-\omega_m t + \frac{2\pi}{3}\right) \end{pmatrix} \cdot i_\phi(\omega_N t, s) \quad (5.44)$$

are obtained.

The three-phase system shown in FIG. 3 is represented in $\alpha$, $\beta$ components as shown in FIG. 4:

The individual positive sequence and negative sequence components can be ascertained from the measured and $\alpha$, $\beta$-transformed currents. To this end, it is possible to orient the components of the positive sequence system such that it can be directly used for controlling the system. Since the orientation of the rotor voltage $U_\psi$ can be assumed to already be determined, this should represent the reference system. The component of the positive sequence system which is in phase with it then corresponds to the torque-forming current $I_d$ and the component which is offset thereto by $\pi/2$ corresponds to the flux-forming current component $I_q$. Since the components of the positive sequence system have to be differentiated from the components of the negative sequence system below, these variables are indexed as $I_{dm}$ and $I_{qm}$. The current component of the negative sequence system which is in phase with $I_{dm}$ is accordingly $I_{dq}$ and the component offset thereto by $\pi/2$ is $I_{qg}$. Therefore, the variables $i_\alpha$ and $i_\beta$ are formed as follows:

$$i_{\alpha\beta}(\omega_N t) = I_{dm} \cdot \begin{pmatrix} \cos(\omega_N t) \\ \sin(\omega_N t) \end{pmatrix} + I_{dg} \cdot \begin{pmatrix} \cos(\omega_N t) \\ -\sin(\omega_N t) \end{pmatrix} + I_{qm} \cdot \begin{pmatrix} -\sin(\omega_N t) \\ \cos(\omega_N t) \end{pmatrix} + I_{qg} \cdot \begin{pmatrix} -\sin(\omega_N t) \\ -\cos(\omega_N t) \end{pmatrix} \quad (5.45)$$

FIG. 5 shows the basic position of the current components in relation to the reference system. If the $\alpha$, $\beta$ components of the transformed phase currents are detected at two different time points or angles, the following equations can be derived for the $\alpha$ components:

$$\begin{pmatrix} i_{\alpha 0} \\ i_{\alpha 1} \end{pmatrix} = \begin{pmatrix} i_\alpha(\omega_N t) \\ i_\alpha(\omega_N t + \Delta\omega_N t) \end{pmatrix} = \quad (5.46)$$

$$\begin{pmatrix} \cos(\omega_N t) & -\sin(\omega_N t) \\ \cos(\omega_N t + \Delta\omega_N t) & -\sin(\omega_N t + \Delta\omega_N t) \end{pmatrix} \cdot \begin{pmatrix} I_{dm} + I_{dg} \\ I_{qm} + I_{qg} \end{pmatrix}$$

This gives $$\begin{pmatrix} \Sigma I_d \\ \Sigma I_q \end{pmatrix} = \quad (5.47)$$

$$\begin{pmatrix} I_{dm} + I_{dg} \\ I_{qm} + I_{qg} \end{pmatrix} = \frac{1}{\sin(\Delta\omega_N t)} \begin{pmatrix} \sin(\omega_N t + \Delta\omega_N t) & -\sin(\omega_N t) \\ \cos(\omega_N t + \Delta\omega_N t) & -\cos(\omega_N t) \end{pmatrix} \cdot \begin{pmatrix} i_{\alpha 0} \\ i_{\alpha 1} \end{pmatrix}$$

Analogously, the equations of the $\beta$ components give $$\begin{pmatrix} i_{\beta 0} \\ i_{\beta 1} \end{pmatrix} = \begin{pmatrix} i_\beta(\omega_N t) \\ i_\beta(\omega_N t + \Delta\omega_N t) \end{pmatrix} = \quad (5.48)$$

$$\begin{pmatrix} \sin(\omega_N t) & \cos(\omega_N t) \\ \sin(\omega_N t + \Delta\omega_N t) & \cos(\omega_N t + \Delta\omega_N t) \end{pmatrix} \cdot \begin{pmatrix} I_{dm} - I_{dg} \\ I_{qm} - I_{qg} \end{pmatrix}$$

which, after conversion, in turn gives $$\begin{pmatrix} \Delta I_d \\ \Delta I_q \end{pmatrix} = \begin{pmatrix} I_{dm} - I_{dg} \\ I_{qm} - I_{qg} \end{pmatrix} = \quad (5.49)$$

$$\frac{1}{\sin(\Delta\omega_N t)} \begin{pmatrix} -\cos(\omega_N t + \Delta\omega_N t) & \cos(\omega_N t) \\ \sin(\omega_N t + \Delta\omega_N t) & -\sin(\omega_N t) \end{pmatrix} \cdot \begin{pmatrix} i_{\beta 0} \\ i_{\beta 1} \end{pmatrix}$$

From the above, the following can be derived for the individual components $$I_{dm} = \frac{\Sigma I_d + \Delta I_d}{2} \quad (5.50)$$

$$I_{dg} = \frac{\Sigma I_d - \Delta I_d}{2} \quad (5.51)$$

$$I_{qm} = \frac{\Sigma I_q + \Delta I_q}{2} \quad (5.52)$$

$$I_{qg} = \frac{\Sigma I_q - \Delta I_q}{2} \quad (5.53)$$

These variables are available to the control arrangement directly as actual variables of a system and replace the previous transformation equations of the phase currents in d, q components. These determining equations can be used both for the $p_1$-pole and for the $p_2$-pole subsystem.

5.3.3 Ascertaining the Rotor, Shaft and Grid Power

The current $$I_{Link1} = I_{\phi 1} D_{\phi 1} \quad (5.54)$$

flows in an upper branch of the WR phase $\varphi_1$ as the arithmetic mean of the current in one pulse period, where $I_{\varphi 1}$ is the instantaneous phase current of the phase $\varphi_1$ and $D_{\varphi 1}$ is a modulation level of said phase that is intended to be determined in a pulse period to be considered.

Analogously to the above, the current in the opposite branch is determined by $$I_{Link4} = I_{\phi 4} D_{\phi 4} \quad (5.55)$$

The phase currents and the modulation levels of the phases are made up of the individual components of the two three-phase systems involved.

$$I_{\Phi 1} = I_{\Phi 1p1} + I_{\Phi 1p2}$$

$$D_{\Phi 1} = \frac{1}{2} + D_{\Phi 1p1} + D_{\Phi 1p2}$$

$$I_{\Phi 4} = I_{\Phi 1p1} - I_{\Phi 1p2}$$

$$D_{\Phi 4} = \frac{1}{2} + D_{\Phi 1p1} - D_{\Phi 1p2}$$

This gives the following for the sum of the currents of two opposite WR branches $$I_{Link1} + I_{Link4} = I_{\phi 1} D_{\phi 1} + I_{\phi 4} D_{\phi 4} = 2 * I_{\phi 1p1} D_{\phi 1p1} + 2 * I_{\phi 1p2} D_{\phi 1p2} + I_{\phi 1p1} \quad (5.56)$$

In the symmetrical three-phase system, the sum of the phase currents $I_{\varphi 1p1}$ where $\varphi = U, V, W$ will be 0. Therefore, the entire intermediate circuit current can be written as $$I_{ZK} = I_{ZKp1} + I_{ZKp2} = 2\underbrace{\begin{pmatrix} I_{Up1} \\ I_{Vp1} \\ I_{Wp1} \end{pmatrix}^T \begin{pmatrix} D_{Up1} \\ D_{Vp1} \\ D_{Wp1} \end{pmatrix}}_{I_{ZKp1}} + 2\underbrace{\begin{pmatrix} I_{Up2} \\ I_{Vp2} \\ I_{Wp2} \end{pmatrix}^T \begin{pmatrix} D_{Up2} \\ D_{Vp2} \\ D_{Wp2} \end{pmatrix}}_{I_{ZKp2}} \quad (5.57)$$

Therefore, the components of the intermediate circuit current of the subsystems can be derived directly from the current components associated with individual systems and from the modulation functions of the individual systems.

Consequently, the rotor powers of the individual systems are $$P_{rot1} = U_{ZK} I_{ZKp1} \quad (5.58)$$

$$P_{rot2} = U_{ZK} I_{ZKp2} \quad (5.59)$$

the shaft powers are $$P_{mech1} = U_{ZK} I_{ZKp1} \left(\frac{1}{s_1} - 1\right) \quad 5.60$$

$$P_{mech2} = U_{ZK} I_{ZKp2} \left(\frac{1}{s_2} - 1\right) \quad 5.61$$

and the grid powers are $$P_1 = U_{ZK} I_{ZKp1} \frac{1}{s_1} \quad (5.62)$$

$$P_2 = U_{ZK} I_{ZKp2} \frac{1}{s_2} \quad (5.63)$$

It is clear from these derivations that conclusions can be drawn about the instantaneous active power ratios from the instantaneous values of the measured phase currents of the rotor-side inverter and knowledge of the modulation.

When calculating both the shaft and also the grid powers, $s_1$, $s_2$ are divided by 0 when the respective synchronous rotation speed is reached, this meaning that the system could be comparatively difficult to observe here as is the case in stator side-operated converters in an asynchronous machine at a rotation speed of 0. However, the rotation speed 0 provides robust values here.

5.3.4 Ascertaining the Rotor-Side Reactive Power

In subsection 5.3.3, the active powers were ascertained from the phase currents and the knowledge of the modulation. Similarly, it is possible to draw conclusions about the reactive powers generated by the inverter in the motor from said variables. To this end, the modulations are to be rotated through $\pi/2$. This rotation can also be achieved by subtracting the modulation function of the respectively two other phases. Then $$I_{Qp1} = \frac{1}{\sqrt{3}} \begin{pmatrix} I_{Up1} \\ I_{Vp1} \\ I_{Wp1} \end{pmatrix}^T \begin{pmatrix} D_{Wp1} - D_{Vp1} \\ D_{Up1} - D_{Wp1} \\ D_{Vp1} - D_{Up1} \end{pmatrix} \quad (5.64)$$

and $$I_{Qp2} = \frac{1}{\sqrt{3}} \begin{pmatrix} I_{Up2} \\ I_{Vp2} \\ I_{Wp2} \end{pmatrix}^T \begin{pmatrix} D_{Wp2} - D_{Vp2} \\ D_{Up2} - D_{Wp2} \\ D_{Vp2} - D_{Up2} \end{pmatrix} \quad (5.65)$$

This gives, as analogous variables to the active powers in the rotor, the reactive powers of the rotor of $$Q_{p1} = U_{ZK} I_{Qp1} \quad (5.66)$$

and $$Q_{p2} = U_{ZK} I_{Qp2} \quad (5.67)$$

The currents $I_{Qp1}$ and $I_{Qp2}$ are calculated variables which cannot be directly measured in the intermediate circuit.

5.3.5 Method for Determining the Initial Grid and Motor Frequency

Before starting the inverter modulation, both the grid frequency and also the motor rotation speed are initially to be determined for correctly initiating the control operation. The determination operation has to be performed without a sensor system, which accesses stator-side variables, in order to avoid transmission of the signals to the rotor.

Provided that the inverter valves are not actuated, a picture of the grid voltage can be observed on the rotor side.

The components of the two opposite voltage systems can be ascertained by means of measuring the phase voltages $u_{L1-L6}$.

The calculations which were used to ascertain the phase currents can likewise be applied to the phase voltages. The following holds true for the components of the two voltage systems:

$$\begin{pmatrix} u_{Up1} \\ u_{Vp1} \\ u_{Wp1} \end{pmatrix} = \frac{1}{2} \begin{pmatrix} u_{L1} + u_{L4} \\ u_{L3} + u_{V6} \\ u_{L5} + u_{U2} \end{pmatrix} \quad (5.68)$$

$$\begin{pmatrix} u_{Up2} \\ u_{Vp2} \\ u_{Wp2} \end{pmatrix} = \frac{1}{2} \begin{pmatrix} u_{L1} - u_{L4} \\ u_{L3} - u_{V6} \\ u_{L5} - u_{U2} \end{pmatrix} \quad (5.69)$$

In general, the amplitudes and the phase angles at the time of the measurement at $t_0=0$ can be determined from the measurement of two voltages which run sinusoidally in a manner offset at a fixed angle in relation to one another. For a phase offset of $2\pi/3$:

$$u_1 = \hat{u}\sin(\varphi) \quad (5.70)$$

$$u_2 = \hat{u}\sin\left(\varphi + \frac{2}{3}\pi\right) = \hat{u}\left(\sin(\varphi)\cos\left(\frac{2}{3}\pi\right) + \cos(\varphi)\sin\left(\frac{2}{3}\pi\right)\right) \quad (5.71)$$

This gives, using $$\frac{u_2}{u_1} = \frac{\sin(\varphi)\cos\left(\frac{2}{3}\pi\right) + \cos(\varphi)\sin\left(\frac{2}{3}\pi\right)}{\sin(\varphi)} = \cos\left(\frac{2}{3}\pi\right) + \cot(\varphi)\sin\left(\frac{2}{3}\pi\right) \quad (5.72)$$

$$\varphi = \arctan\left(\frac{\sin\left(\frac{2}{3}\pi\right)}{\frac{u_2}{u_1} - \cos\left(\frac{2}{3}\pi\right)}\right) \quad (5.73)$$

for the angle $\varphi$ of the voltage at the time of the measurement

For the voltages $u_1$ and $u_2$, $u_1=u_{Up1}$ and $u_2=u_{Vp1}$ from equation 5.68 can be used to ascertain $\varphi_{p1}$, and $u_1=u_{Up2}$ and $u_2=u_{Vp2}$ from equation 5.69 can be used for ascertaining $\varphi_{p2}$. In relation to both subsystems of the machine, the angle $\varphi$ progresses depending on the present grid frequency and the rotation speed of the motor (the rotation speed of the motor generally cannot be assumed to be 0 when the inverter is not modulated):

$$\varphi_{p1}(t_x)=(\omega_n-p_1\omega_m)t_x+\varphi_{p1}(t_0) \quad (5.74)$$

$$\varphi_{p2}(t_x)=(\omega_n+p_2\omega_m)t_x+\varphi_{p2}(t_0) \quad (5.75)$$

where $\omega_n$ is the angular frequency of the grid voltage and $\omega_m$ is the angular frequency of the motor rotation speed.

If $$\Delta\varphi_{p1}=\varphi_{p1}(t_x)-\varphi_{p1}(t_0) \quad (5.76)$$

and $$\Delta\varphi_{p2}=\varphi_{p2}(t_x)-\varphi_{p1}(t_0) \quad (5.77)$$

and $$\Delta t=t_x-t_0 \quad (5.78)$$

are set, equation 5.74 and equation 5.75 give, for the grid frequency and motor frequency, the expressions $$\omega_n = \frac{\Delta\varphi_{p1}p_2 + \Delta\varphi_{p2}p_1}{\Delta t(p_1 + p_2)} \quad (5.79)$$

$$\omega_m = \frac{\Delta\varphi_{p2} + \Delta\varphi_{p1}}{\Delta t(p_1 + p_2)} \quad (5.80)$$

It should be noted here that $\Delta t<T_n/4$ ($T_n$=likely period duration of the grid frequency) is selected on account of the arctan function in equation 5.73.

Accordingly, the motor rotation speed and the grid frequency and also the phase position of the voltages of the subsystems can be determined unambiguously from the measurement of four rotor-side voltages against the star point of the winding (without ongoing modulation of the inverter) at two time points. If the star point of the winding is available as a reference point for the measurements, the relationships derived above can be used directly for determining the initial values for rotation speed and grid frequency.

In general, the star point of the windings is not available as a reference point for the measurements. However, the voltage measurements of the rotor voltages can be carried out against any desired reference point. To this end, a fifth rotor voltage is to be added for measurement purposes.

The motor voltage system is shifted by $$u_{mb} = \frac{(u_{L1b} + u_{L3b} + u_{L5b})}{3} \quad (5.81)$$

in relation to the reference point for the measurement. The measured voltages are to be reduced by this voltage in order to obtain the rotor phase voltages.

The rotor-side voltage system is described by the relationships $$\begin{pmatrix} u_{L1b} \\ u_{L2b} \\ u_{L3b} \\ u_{L4b} \\ u_{L5b} \\ 0 \\ 0 \end{pmatrix} = \begin{pmatrix} 1 & 1 & 0 & 0 & 0 & 0 & 1 \\ 0 & 0 & 0 & 0 & 1 & -1 & 1 \\ 0 & 0 & 1 & 1 & 0 & 0 & 1 \\ 1 & -1 & 0 & 0 & 0 & 0 & 1 \\ 0 & 0 & 0 & 0 & 1 & 1 & 1 \\ 0 & 1 & 0 & 1 & 0 & 1 & 0 \\ 1 & 0 & 1 & 0 & 1 & 0 & 0 \end{pmatrix} * \begin{pmatrix} u_{Up1} \\ u_{Up2} \\ u_{Vp1} \\ u_{Vp2} \\ u_{Wp1} \\ u_{Wp2} \\ u_{mb} \end{pmatrix} \quad (5.82)$$

The index b denotes that the indicated voltage variable relates to the reference potential. The individual components of the voltage are calculated from this in turn by $$\begin{pmatrix} u_{Up1} \\ u_{Up2} \\ u_{Vp1} \\ u_{Vp2} \\ u_{Wp1} \\ u_{Wp2} \\ u_{mb} \end{pmatrix} = \begin{pmatrix} \frac{u_{L1b} + u_{LAb}}{2} - u_{mb} \\ \frac{u_{L1b} - u_{LAb}}{2} \\ -\frac{u_{L1b} + u_{L2b} + u_{LAb} + u_{L5b}}{2} + 2u_{mb} \\ \frac{u_{L2b} - u_{L5b} + u_{LAb} + u_{L5b}}{2} \\ \frac{u_{L5b} + u_{L2b}}{2} - u_{mb} \\ \frac{u_{L5b} - u_{L2b}}{2} \\ \frac{u_{L1b} + u_{L3b} + u_{L5b}}{3} \end{pmatrix} \quad (5.83)$$

FIG. 6 shows a voltage system at the rotor.

The star point of the rotor windings can also be spread over two independent star points. The phases $L_1$, $L_3$, $L_5$ and $L_2$, $L_4$, $L_6$ are respectively guided to their own star point here. As a result, the voltages of the two subsystems are described in accordance with FIG. 7.

The equation system of the rotor-side voltages is formulated as $$\begin{pmatrix} u_{L1b} \\ u_{L2b} \\ u_{L3b} \\ u_{LAb} \\ u_{L5b} \\ u_{L6b} \\ 0 \\ 0 \end{pmatrix} = \begin{pmatrix} 1 & 1 & 0 & 0 & 0 & 0 & 1 & 0 \\ 0 & 0 & 0 & 0 & 1 & -1 & 0 & 1 \\ 0 & 0 & 1 & 1 & 0 & 0 & 1 & 0 \\ 1 & -1 & 0 & 0 & 0 & 0 & 0 & 1 \\ 0 & 0 & 0 & 0 & 1 & 1 & 1 & 0 \\ 0 & 0 & 1 & -1 & 0 & 0 & 0 & 1 \\ 1 & 0 & 1 & 0 & 1 & 0 & 0 & 0 \\ 0 & 1 & 0 & 1 & 0 & 1 & 0 & 0 \end{pmatrix} * \begin{pmatrix} u_{Up1} \\ u_{Up2} \\ u_{Vp1} \\ u_{Vp2} \\ u_{Wp1} \\ u_{Wp2} \\ u_{mab} \\ u_{mbb} \end{pmatrix} \quad (5.84)$$

Where $$u_{mab} = \frac{(u_{L1b} + u_{L3b} + u_{L5b})}{3} \quad (5.85)$$

and $$u_{mbb} = \frac{(u_{L2b} + u_{LAb} + u_{L6b})}{3} \quad (5.86)$$

the equation system of the rotor voltages is reduced to $$\begin{pmatrix} u_{L1b} - u_{mab} \\ u_{L2b} - u_{mbb} \\ u_{L3b} - u_{mab} \\ u_{LAb} - u_{mbb} \\ u_{L5b} - u_{mab} \\ u_{L6b} - u_{mbb} \end{pmatrix} = \begin{pmatrix} 1 & 1 & 0 & 0 & 0 & 0 \\ 0 & 0 & 0 & 0 & 1 & -1 \\ 0 & 0 & 1 & 1 & 0 & 0 \\ 1 & -1 & 0 & 0 & 0 & 0 \\ 0 & 0 & 0 & 0 & 1 & 1 \\ 0 & 0 & 1 & -1 & 0 & 0 \end{pmatrix} * \begin{pmatrix} u_{Up1} \\ u_{Up2} \\ u_{Vp1} \\ u_{Vp2} \\ u_{Wp1} \\ u_{Wp2} \end{pmatrix} \quad (5.87)$$

From this, the following is determined $$\begin{pmatrix} u_{Up1} \\ u_{Up2} \\ u_{Vp1} \\ u_{Vp2} \\ u_{Wp1} \\ u_{Wp2} \end{pmatrix} = \frac{1}{2} \begin{pmatrix} (u_{L1b} + u_{LAb}) - (u_{mab} + u_{mbb}) \\ (u_{L1b} - u_{LAb}) - (u_{mab} - u_{mbb}) \\ (u_{L3b} + u_{L6b}) - (u_{mab} + u_{mbb}) \\ (u_{L3b} - u_{L6b}) - (u_{mab} - u_{mbb}) \\ (u_{L5b} + u_{L2b}) - (u_{mab} + u_{mbb}) \\ (u_{L5b} - u_{L2b}) - (u_{mab} - u_{mbb}) \end{pmatrix} \quad (5.88)$$

In the case of two separate star points, all six phase voltages are accordingly to be measured against any desired reference point in order to ascertain therefrom the picture of the stator voltages for the operating state with dormant modulation of the rotor inverter.

In a practical implementation, it is possible to carry out a Clarke transformation with the measured phase voltages. Furthermore, the calculated components of the reference voltages $u_{mab}$ and $u_{mbb}$ are dispensed with. The transformation equations are given as $$u_{p1\alpha,\beta} = \frac{1}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} (u_{L1b} - u_{LAb}) \\ (u_{L3b} + u_{L6b}) \\ (u_{L5b} + u_{L2b}) \end{pmatrix} \quad (5.89)$$

and $$u_{p2\alpha,\beta} = \frac{1}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} (u_{L1b} - u_{LAb}) \\ (u_{L3b} - u_{L6b}) \\ (u_{L5b} - u_{L2b}) \end{pmatrix} \quad (5.90)$$

Equation 5.72, with a phase offset of the $\alpha$, $\beta$-transformed voltages of $\pi/2$, gives for the angle $\phi$ according to equation 5.73

$$\varphi_{px\alpha,\beta} = \arctan\left(\frac{u_{px\alpha}}{u_{px\beta}}\right) \quad (5.91)$$

The initial value for starting the modulation of the inverter can be derived directly from $u_{p1\alpha, 6}$ and $u_{p2\alpha, 6}$. The start values for calculating the grid frequency and rotor frequency are formed using equation 5.79 and equation 5.80. Knowledge of the absolute start angle of the grid voltage or the rotor position is not explicitly required since the influence thereof is already included in the calculation of the initial value of the voltage modulation. The start angles of the grid voltage or the rotor position are therefore to be set to 0 for time point $t_0$.

5.3.6 Position and Rotation Speed Detection

In order to approximately determine the rotation speed from the variables which can be observed on the rotor, the behavior of the angular relationships between the rotor voltage and the grid voltage is initially determined. The voltage U'$_2$ which can be observed in the stationary state as the reference variable is used as the rotor voltage. The voltage U'$_2$ is made up of the inverter voltage to be generated and the voltage component (1-s)*U$_\psi$ which is dependent on the rotational speed.

5.3.6.1 Determining the Load Angle without Taking into Account Rs And R'r

The equivalent circuit diagram of the double-fed induction machine without taking into account the copper and iron losses and without saturation phenomena is adopted for a subsystem.

FIG. 8 shows an equivalent circuit diagram for determining the load angle (without taking into account resistive losses).

Currents and voltages are to be interpreted in the following paragraphs as complex variables, without this being taken into account in the notation.

Here, $U'_2$ is defined as the reference variable. It should hold true that $U'_2$=Re($U'_2$) and consequently Im($U'_2$)=0.

The voltage across the main inductance $L_h$ is $$U_h = U'_2 - j\omega L'_{\sigma 2} I'_2 \quad (5.92)$$

and the grid voltage $U_N$ is $$U_S = U_h + j\omega L_{\sigma 1} I_1 \quad (5.93)$$

from which $$U_N = U'_2\left(1 + \frac{L'_{\sigma 1}}{L_h}\right) - j\omega L'_{\sigma 2} I'_2\left(1 + \frac{L_{\sigma 1}}{L_h} + \frac{L_{\sigma 1}}{L'_{\sigma 2}}\right) \quad (5.94)$$

can be developed.

The load angle $\theta_{load}$ between $U_N$ and $U'_2$ is then $$\vartheta_{load} = \operatorname{asin}\left(\frac{Im(U_n)}{|U_N|}\right) \quad (5.95)$$

With the given grid voltage $U_N$ it is expedient to rearrange the abovementioned equations in accordance with $U'_2$, this giving $$U'_2 = U_N\left(\frac{L_h}{L_h + L_{\sigma 1}}\right) + j\omega I'_2\left(L'_{\sigma 2}{}' + \frac{L_{\sigma 1} L_h}{L_{\sigma 1} + L_h}\right) \quad (5.96)$$

For Im($U'_2$)=0, it then holds true that $$Im(U_N)\frac{L_h}{L_h + L_{\sigma 1}} = Re(I'_2)\omega\left(L' + \frac{L_{\sigma 1} L_h}{L_h + L_{\sigma 1}}\right) \quad (5.97)$$

The load angle $\theta_{load}$ can now be written as $$\vartheta_{load} = \operatorname{asin}\left(Re(I'_2)\frac{\omega}{|U_N|}\left(L'_{2\sigma}\frac{L_h + L_{\sigma 1}}{L_h} + L_{\sigma 1}\right)\right) \quad (5.98)$$

If the idling magnetization current $I_{h0}$, where $$I_{h0} = \frac{|U_N|}{\omega * (L_h + L_{\sigma 1})} \quad (5.99)$$

is introduced, the notation $$\vartheta_{load} = \operatorname{asin}\left(\frac{Re(I'_2)}{I_{h0}}\left(\frac{L'_{\sigma 2}}{L_h} + \frac{L_{\sigma 1}}{L_h + L_{\sigma 1}}\right)\right) \quad (5.100)$$

is obtained.

Since it can be assumed that $L_h \gg L_{\sigma 1}$ and $L_{\sigma 1} \approx L'_{\sigma 2}$, this relationship can be simplified in good approximation to $$\vartheta_{load} \approx \operatorname{asin}\left(\frac{Re(I'_2)}{I_{h0}}\frac{2 * L_{\sigma 1}}{L_h}\right) \quad (5.101)$$

As an estimate, $L_{\sigma 1}/L_h$=0.05 can be set in machines with a power of approximately 1 kW.

Given a load angle of $\theta_{load}$=π/4, this means that the active component of the load current can already reach 10 times the value of the magnetization current. Therefore, technically usable load angles are to be assumed to be below π/4.

The following image shows a result, originating from a simulation, of the profile of the load torques of the two systems and the resulting load angles $\theta_{load1,2}$. Said image shows the acceleration from rotation speed 0 to rated rotation speed with a constant load torque of 5 Nm.

FIG. 9 shows the load angle $\vartheta_{load1, 2}$ (scaled in °) with respect to t during acceleration under constant load.

5.3.6.2 Determining the Grid and Rotor Voltages Taking into Account Rs and R'r

The following equations can be ascertained from the equivalent circuit diagram of a partial motor according to drawing 5.1.1 and can be inserted one into another:

$$U_h = U'_2 - I'_2(R'_r + j\omega L'_r) \quad (5.102)$$

$$I_h = \frac{U_h}{j\omega L_h} = \frac{U'_2}{j\omega L_h} - I'_2\frac{R'_r + j\omega L'_r}{j\omega L_h} \quad (5.103)$$

$$I_1 = I_h - I'_2 = \frac{U'_2}{j\omega L_h} - I'_2\left(1 + \frac{R'_r + j\omega L'_r}{j\omega L_h}\right) \quad (5.104)$$

$$U_n = U_h + I_1(R_s + j\omega L_s) \quad (5.105)$$

$$U_n = \quad (5.106)$$
$$U'_2 - I'_2(R'_r + j\omega L'_r) + \left(\frac{U'_2}{j\omega L_h} - I'_2\left(1 + \frac{R'_r + j\omega L'_r}{j\omega L_h}\right)\right)(R_s + j\omega L_s)$$

$$U_n = U'_2\left(1 + \frac{R_s + j\omega L_s}{j\omega L_h}\right) - \quad (5.107)$$
$$I'_2\left(R'_r + j\omega L'_r + R_s + j\omega L_s + \frac{R'_r + j\omega L'_r}{j\omega L_h}(R_s + j\omega L_s)\right)$$

$$U_n = U'_2\left(1 + \frac{L_s}{L_h} - j\frac{R_s}{\omega L_h}\right) - \quad (5.108)$$
$$I'_2\left(R_s + R'_r + j\omega(L_s + L'_r) + R_s\frac{L'_r}{L_h} + R'_s\frac{L_s}{L_h} - j\left(\frac{R'_r R_s}{\omega L_h} - \frac{\omega L'_r L_s}{L_h}\right)\right)$$

The amplitude of the grid voltage $U_n$ is assumed to be known. The current $I_2$ is impressed.

Therefore, the equation can be rearranged to $$U'_2 = \frac{U_n + I'_2\left(\begin{array}{c} R_s + R'_r + j\omega(L_s + L'_r) + \\ R_s\frac{L'_r}{L_h} + R'_r\frac{L_s}{L_h} - j\left(\frac{R'_r R_r}{\omega L_h} - \frac{\omega L'_r L_s}{L_h}\right) \end{array}\right)}{\left(1 + \frac{L_s}{L_h} - j\frac{R_s}{\omega L}\right)} \quad (5.109)$$

which, after separation into components which are dependent on $U_n$ and $I'_2$, gives $$U'_2 = \frac{U_n}{1 + \frac{L_s}{L_h} - j\frac{R_s}{\omega L_h}} + \frac{I'_2\left(\begin{array}{c} R_s + R'_r + j\omega(L_s + L'_r) + \\ R_s\frac{L'_r}{L_h} + R'_r\frac{L_s}{L_h} - j\left(\frac{R'_r R_s}{\omega L_h} - \frac{\omega L'_r L_s}{L_h}\right) \end{array}\right)}{1 + \frac{L_s}{L_h} - j\frac{R_s}{\omega L_h}} \quad (5.110)$$

Since the rotor current $I'_2$ is based on the rotor voltage $U'_2$, the rotor voltage $U'_2$ is advantageously set as the reference variable such that $U'_2 = \text{Re}(U'_2)$ or $\text{Im}(U'_2) = 0$ results. It follows from this that $$\text{Im}\left(\frac{U_n}{1 + \frac{L_s}{L_h} - j\frac{R_s}{\omega L_h}}\right) = \quad (5.111)$$

$$-\text{Im}\left(\frac{I'_2\left(\begin{array}{c} R_s + R'_s + j\omega(L_s + L'_r) + \\ R_s\frac{L'_r}{L_h} + R'_r\frac{L_s}{L_h} - j\left(\frac{R'_r R_s}{\omega L_h} - \frac{\omega L'_r L_s}{L_h}\right) \end{array}\right)}{1 + \frac{L_a}{L_h} - j\frac{R_s}{\omega L_h}}\right)$$

If $I'_2 = I'_{2active} + jI'_{2reactive}$ is introduced for the current which is based on $U'_2$, the current which is rotated and extended by $$\left(1 + \frac{LS}{Lh} - j\frac{RS}{\omega Lh}\right) \text{ is} \quad (5.112)$$

$$I^*_2 = I'_2 \frac{1}{1 + \frac{L_s}{L_h} - j\frac{R_s}{\omega L_h}}$$

with $I^*_{2active} = \text{Re}(I^*_2)$ and $I^*_{2active} = \text{Im}(I^*_2)$.

The real part of the likewise extended and rotated grid voltage $U^*_n$ is now to be set to 0, from where $$\text{Im}(U^*_n) = -I^*_{2active}\left(\omega(L_s + L'_r) + \frac{\omega L'_r L_s}{L_h} - \frac{R'_r R_s}{\omega L_h}\right) - \quad (5.113)$$
$$I^*_{2reactive}\left(L_s + L'_r + R_s\frac{L'_r}{L_h} + R'_r\frac{L_s}{L_h}\right)$$

can be derived. $\text{Re}(U^*_n)$ then has to be:

$$\text{Re}(U^*_n) = \sqrt{\left|\left(\frac{|U_n|}{1 + \frac{L_s}{L_h} - j\frac{R_s}{\omega L_h}}\right)\right|^2 - \text{Im}(U^*_n)^2} \quad (5.114)$$

The grid voltage $U^*_n$ obtained is now $$U^*_n = \text{Re}(U^*_n) + j\text{Im}(U^*_n) \quad (5.115)$$

and the back-transformed grid voltage $U_n$ is $$U_n = U^*_n\left(1 + \frac{L_s}{|L_h|} - j\frac{R_s}{\omega L_h}\right) \quad (5.116)$$

5.3.6.3 Determining the Load Angle Between the Grid Voltage and the Rotor Voltage If the auxiliary variables $$x_1 = 1 + \frac{L_s}{L_h}, \quad x_2 = \frac{R_2}{\omega L_h} \text{ and}$$

$$x_3 = 1 + \frac{L'_r}{L_h}$$

are introduced into equation 5.110, the notation for $U'_2$ is reduced to $$U'_2 = \frac{U_n}{x_1 - jx_2} + \frac{I'_2}{x_1 - jx_2}(R'_r x_1 + R_s x_3 + j\omega L'_r x_1 + j\omega L_s - jR'_r x_2) \quad (5.117)$$

this giving $$U'_2 = \quad (5.118)$$
$$U_n\frac{x_1 + jx_2}{x_1^2 + x_2^2} + I'_2\frac{x_1 + jx_2}{x_1^2 + x_2^2}(R'_r x_1 + R_s x_3 + j\omega L'_r x_1 + j\omega L_s - jR'_r x_2)$$

after conversion to a real denominator. Since $\text{Im}(U'_2) = 0$ can be defined by orientation of the rotor voltage to the real axis, it follows that $$\text{Im}(U_n(x_1 + jx_2)) = -\text{Im}(I'_2(x_1 + jx_2)(R'_r x_1 + R_s x_3 + j\omega L'_r x_1 + j\omega L_2 - jR'_r x_2)) \quad (5.119)$$

This gives $$\text{Re}(U_n)x_2 + \text{Im}(U_n)x_1 = (-\text{Re}(I'_2)x_2 - \text{Im}(I'_2)x_1)(R'_r x_1 + R_s x_2) - \quad (5.120)$$
$$(\text{Re}(I'_2)x_1 - \text{Im}(I'_2)x_2)(\omega(L'_r x_1 + L_s) - R'_r x_2)$$

The relationship $$Re(U_n) = \sqrt{|U_n|^2 - Im(U_n)^2} \qquad (5.121)$$

holds true for the grid voltage.

Furthermore, the grid-side idling magnetization current $I_{h0}$ where $$I_{h0} = \frac{|U_n|}{|R_s + j\omega(L_s + L_h)|} = \frac{|U_n|}{\left|\omega L_h \sqrt{(x_1^2 + x_2^2)}\right|} \qquad (5.122)$$

can be introduced as the reference variable of the current, and $$x_1 \frac{Im(U_n)}{|U_n|} + x_2 \sqrt{1 - \frac{Im(U_n)^2}{|U_n|^2}} = \qquad (5.123)$$

$$\frac{(-Re(I'_2)x_2 - Im(I'_2 x_1)(R'_r x_1 + R x_3)}{I_{h0}\omega L_h \sqrt{(x_1^2 + x_2^2)}} -$$

$$\frac{(Re(I'_2)x_1 - Im(I'_2))(\omega(L'_r x_1 + L_s) - R_s x_2)}{I_{h0}\omega L_h \sqrt{(x_1^2 + x_2^2)}}$$

can be developed from this. Using known addition theorems $$\frac{x_1 \sin(\vartheta_{load}) + x_2 \sqrt{1 - \sin^2(\vartheta_{load})}}{\sqrt{(x_1^2 + x_2^2)} \cos(\vartheta_{load} + \operatorname{atan} x_1 / x_2)} = \qquad (5.124)$$

can be set for the left-hand side, this leading to an exclusive formulation of the load angle $\vartheta_{load}$ as $\vartheta_{load} = f(Re(I'_2), Im(I'_2))$:

$$\vartheta_{load0} = a\cos\left(\frac{(-Re(I'_2)x_2 - Im(I'_2)x_1)(R'_r x_1 + R_s x_3) -}{(Re(I'_2)x_1 - Im(I'_2)x_2)(\omega(L'_r x_1 + L_s) - R_r x_2)}{I_{h0}\omega L_h(x_1^2 + x_2^2)}\right) \qquad (5.125)$$

Without a rotor-side active current $Re(I'_2)=0$, the load angle $\theta_{load0}=\theta_{load}$ $(Re(I'_2)=0)$ is $$\vartheta_{load0} = a\cos\left(\frac{-Im(I'_2)x_1(R'_r x_1 + R_s x_3) +}{Im(I'_2)x_2(\omega(L'_r x_1 + L_s) - R_r x_2)}{I_{h0}\omega L_h(x_1^2 + x_2^2)}\right) - \operatorname{atan}\frac{x_1}{x_2} \qquad (5.126)$$

Exemplary Profile of the Load Angle $\vartheta_{load}$

If the parameters used in equation 5.125 are based on an exemplary use of a 750 Watt motor with the values $L_S$=21.96 mH, $L'_r$=22.27 mH, $L_h$=454.3 mH, $R_S$=7 Ω, $R'_r$=7 Ω, $U_n$=230 V and $f_n$=50 Hz, curve profiles as illustrated in FIG. 10 are obtained. In this illustration, the active current is based on the idling current $I_{h0}$. The profile shows that the load angle changes linearly with the active current of the machine in wide ranges and in the process has an offset which is described by equation 5.126.

5.3.6.4 Determining the Frequency Deviation of the Grid from the Position Angles of the Rotor Voltages The objective is to ascertain the rotation speed of the motor without a sensor system for feeding back the rotor position or rotor rotation speed. The currents of the inverter phases, which currents are measured on the rotor side, are available. As was shown in subsection 5.3.5, the grid voltage, the grid frequency and also the actual rotation speed and rotation direction of the motor can be determined from an initial measurement of the rotor voltages before modulation of the inverter begins.

During operation of the rotor-side inverter, the rotation angles of the rotor voltages of the two rotating fields in relation to the phase angle of the grid as a reference variable in the steady state are $$\varphi_1 = \omega_1 t = (\omega_{N0} - p_1 \omega_m)t + \vartheta_{1load}(M_1(s_1)) + \varphi_{10} \qquad (5.127)$$

$$\varphi_2 = \omega_2 i = (\omega_{N0} + p_2 \omega_m)t + \vartheta_{2load}(M_2(s_2)) + \varphi_{20} \qquad (5.128)$$

where
$\omega_{1,2}$=output frequencies of the inverter
$\omega_{N0}$=assumed grid frequency
$\omega_m$=assumed rotor rotation speed
$\vartheta_{1,2load}$=load-dependent angular deflection of the rotor voltages in relation to the grid voltage
$\varphi_{10,20}$=angular deflection of the rotor voltage in the torque-free state Since, in general, it cannot be assumed that the grid frequency and the rotor rotation speed exactly follow these determining equations, possible deviations are to be taken into account.

$$(\omega_1 + \Delta\omega_1)t = (\omega_{N0} + \Delta\omega_N - p_1(\omega_m + \Delta\omega_m))t + \vartheta_{1load} + \varphi_{10} \qquad (5.129)$$

$$(\omega_2 + \Delta\omega_2)t = (\omega_{N0} + \Delta\omega_N + p_2(\omega_m + \Delta\omega_m))t + \vartheta_{2load} + \varphi_{20} \qquad (5.130)$$

Since $$\omega_{1,2} = \omega_{N0} + p_{1,2}\omega_m \qquad (5.131)$$

it is sufficient to limit the further process to the angular deviations and the load-dependent terms. The following is then given for the resulting angular errors $$\Delta\varphi_1 = \Delta\varphi_N - p_1 \Delta\varphi_m + \vartheta_{1load} + \varphi_{10} \qquad (5.132)$$

$$\Delta\varphi_2 = \Delta\varphi_N + p_2 \Delta\varphi_m + \vartheta_{2load} + \varphi_{20} \qquad (5.133)$$

from which $$\Delta\varphi_N = \frac{1}{p_1 + p_2}(p_1 \Delta\varphi_2 + p_2 \Delta\varphi_1) - \qquad (5.134)$$

$$\frac{1}{p_1 + p_2}(p_1 \vartheta_{2load} + p_2 \vartheta_{1load} + p_1 \varphi_{20} + p_2 \varphi_{10})$$

can be derived for an angular error which is caused by a shift in grid frequency and $$\Delta\varphi_m = \frac{1}{p_1 + p_2}(\Delta\varphi_2 - \Delta\varphi_1) - \frac{1}{p_1 + p_2}(\vartheta_{2load} - \vartheta_{1load} + \varphi_{20} - \varphi_{10}) \qquad (5.135)$$

can be derived for an angular error which is caused by a rotation speed deviation.

In the corrected state of the machine, the angular error according to equation 5.135 which is caused by a rotation speed deviation becomes $\Delta\varphi_m=0$. As a result, the load angles $\theta_{1load}$ and $\theta_{2load}$ according to equation 5.125 can be determined from the angles $\Delta\varphi_1$ and $\Delta\varphi_2$ which are formed by means of the measured rotor currents. It holds true that:

$$\vartheta_{1load} = \Delta\varphi_1 - \varphi_{10} \quad (5.136)$$

$$\vartheta_{2load} = \Delta\varphi_2 - \varphi_{20} \quad (5.137)$$

It is further assumed that the load angles $\theta_{1,2load}$ behave linearly with the torque which is generated by the respective subsystem. In this case, $\theta_0$ is the load angle which would be established in the 1st subsystem when the instantaneous shaft torque $M_0$ is generated. Analogously to this, $\theta_{2load0}$ is the angle in the 2nd subsystem which would be produced in this system when the torque $M_0$ is generated. Given a constant load torque, the load angles therefore develop against the slip by means of $$\vartheta_{1load}(s_1) = \vartheta_0 \frac{M_{mech1}}{M_0} = \vartheta_0\left(1 - \frac{p_2}{p_1 + p_2}s_1\right) \quad (5.138)$$

$$\vartheta_{2load}(s_1) = \vartheta_{2load0} \frac{M_{mech2}}{M_0} = k_\vartheta \vartheta_0\left(\frac{p_2}{p_1 + p_2}s_1\right) \quad (5.139)$$

where $$k_\vartheta = \frac{\vartheta_{2load0}}{\vartheta_0} \quad (5.140)$$

In this way, $$\vartheta_{0N} = \frac{\vartheta_{2load}(s_1) - \vartheta_{1load}(s_1)}{(1+k_\vartheta)\frac{p_2 s_1}{p_1+p_2} - 1} = \frac{(\Delta\varphi_2 - \Delta\varphi_1) - (\varphi_{20} - \varphi_{10})}{(1+k_\vartheta)\frac{p_2 s_1}{p_1+p_2} - 1} \quad (5.141)$$

is obtained.

The additional indexing of $\theta_0$ as $\theta_{0N}$ indicates that $\theta_{0N}$ is independent of a shift in the grid frequency.

There is no pole point of this equation in the range of $-4 < k_g < -0.5$ and $0 < s_1 < 3$ which is of technical interest, and therefore $\theta_{0N}$ can be used below for tracking the grid frequency using said equation.

For the expression $p_1\theta_{1load} + p_2\theta_{2load1}$, it is now given that $$p_1 \vartheta_{2load} + p_2 \vartheta_{1load} = \vartheta_{0N} p_2 \left(1 + s_1\left(\frac{k_\vartheta p_1 - p_2}{p_1 + p_2}\right)\right) \quad (5.142)$$

For the special case, it is assumed that $k_\theta = -1$ (the negative mathematical sign is accounted for by the direction of action of the second subsystem in relation to the first). In this case, the relationships stated above can be simplified to $$-\vartheta_{0N} = \vartheta_{2load} - \vartheta_{1load} \quad (5.143)$$

and $$p_1 \vartheta_{2load} + p_2 \vartheta_{1load} = \vartheta_{0N} p_2 (1 - s_1) = \vartheta_{0N} p_2 \frac{n}{n_0} \quad (5.144)$$

The angle $\theta_{0N}$ used in equation 5.142 is based on equation 5.141. Said angle is formed by means of the difference between the load angles of the individual systems and in this way is independent of an angular shift which is formed by a frequency deviation in the grid frequency. This independence is given by $$\frac{\partial \Delta\varphi_2}{\partial \Delta\varphi_N} - \frac{\partial \Delta\varphi_1}{\partial \Delta\varphi_N} = 0 \quad (5.145)$$

Inversely, an independence from an angular shift which is produced by a frequency deviation in the rotor frequency is given for the expression $p_1\theta_{2load} + p_2\theta_{1load}$. This is shown by means of $$p_1 \frac{\partial \Delta\varphi_2}{\partial \Delta\varphi_m} + p_2 \frac{\partial \Delta\varphi_1}{\partial \Delta\varphi_m} = 0 \quad (5.146)$$

When this relationship is used, the expression $$\vartheta_{0m} = \frac{p_1 \vartheta_{2load}(s_1) + p_2 \vartheta_{1load}(s_1)}{p_2\left(1 - \frac{p_2 - k_\vartheta p_1}{p_2 + p_1}s_1\right)} = \quad (5.147)$$

$$\frac{(p_1\Delta\varphi_2 + p_2\Delta\varphi_1) - (p_1\varphi_{20} + p_2\varphi_{10})}{p_2\left(1 - \frac{p_2 - k_\vartheta p_1}{p_2 + p_1}s_1\right)}$$

is obtained for $\theta_{0m}$.

The pole points of this expression are determined as $$s_{1pole} = f(k_\vartheta) = \frac{p_2 + p_1}{p_2 - k_\vartheta p_1} \quad (5.148)$$

There is always a pole point of the equation 5.147 in the range of $-4 < k_\theta < -0.5$ and $0 < s_1 < 3$ of technical interest, and therefore $\theta_{0m}$ cannot be directly formed for calculating the rotor rotation speed using said equation.

5.3.6.5 Determining the Transformation Angle of the d-q Transformation

The transformation angles of the d-q transformation and, respectively, the back-transformation thereof are described, in principle, by equation 5.129 and equation 5.130. Equation 5.131 holds true for the transformation angles which are independent of the load angles and angular errors. Angles which are determined, from the equations ascertained in the above section, as $$\Delta\varphi_{trans1} = \Delta\varphi_N - p_1\Delta\varphi_m + \vartheta_{1load}(s_1) + \varphi_{10} \quad (5.149)$$

and, respectively, $$\Delta\varphi_{trans2} = \Delta\varphi_N + p_2\Delta\varphi_m + \vartheta_{2load}(s_1) + \varphi_{20} \quad (5.150)$$

or in written-out form as $$\Delta\varphi_{trans1} = \frac{p_1(\Delta\varphi_2 - \varphi_{20}) + p_2(\Delta\varphi_1 - \varphi_{10})}{p_1 + p_2} - \frac{\vartheta_{0N} p_2\left(1 + s_1\left(\frac{k_\vartheta p_1 - p_2}{p_1 + p_2}\right)\right)}{p_1 + p_2} - \underbrace{\quad}_{\Delta\omega_N t = \Delta\varphi_N} \quad (5.151)$$

-continued $$\frac{p_1(\Delta\varphi_2 - \varphi_{20} - \Delta\varphi_1 - \varphi_{10})}{p_1 + p_2} - \underbrace{\frac{\vartheta_{0m} p_1\left((1+k_\vartheta)\frac{p_2 s_1}{p_1+p_2} - 1\right)}{p_1 + p_2}}_{p_1\Delta\omega_m t = p_1 \Delta\varphi_m} +$$

$$\underbrace{\vartheta_{0m}\left(1 - \frac{p_2 s_1}{p_1 + p_2}\right) + \varphi_{10}}_{\vartheta_{1load}}$$

and, respectively, $$\Delta\varphi_{trans2} = \frac{p_1(\Delta\varphi_2 - \varphi_{20}) + p_2(\Delta\varphi_1 - \varphi_{10})}{p_1 + p_2} - \underbrace{\frac{\vartheta_{0N} p_2\left(1 + s_1\left(\frac{k_\vartheta p_1 - p_2}{p_1 + p_2}\right)\right)}{p_1 + p_2}}_{\Delta\omega_N t = \Delta\varphi_N} + \tag{5.152}$$

$$\frac{p_2(\Delta\varphi_2 - \varphi_{20} - \Delta\varphi_1 + \varphi_{10})}{p_1 + p_2} - \underbrace{\frac{\vartheta_{0m} p_2\left((1+k_\vartheta)\frac{p_2 s_1}{p_1+p_2} - 1\right)}{p_1 + p_2}}_{p_2 \Delta\omega_m t = p_2 \Delta\varphi_m} +$$

$$\underbrace{\frac{k_\vartheta \vartheta_{0m} p_2 s_1}{p_1 + p_2} + \varphi_{20}}_{\vartheta_{2load}}$$

are to be added to said transformation angles. Algebraic summary gives the simple relationships $$\Delta\varphi_{trans1} = \Delta\varphi_1 \tag{5.153}$$

$$\Delta\varphi_{trans2} = \Delta\varphi_2 \tag{5.154}$$

The angles $\Delta\phi_1$ and $\Delta\phi_2$ can be determined in the relationships shown here in the ranges of $-\pi/2 \leq \Delta\varphi_{1,2} \leq \pi/2$ using equation 5.125. Therefore, angular components which are integrated with respect to time can be separated out and separately corrected by grid or rotor rotation speed deviations.

In a system with feedback, the angular deviation caused by a rotor rotation speed deviation is set to $\Delta_{\varphi_m} = 0$.

The grid angular error component $\Delta\varphi_N$ of the transformation is then to be corrected to $$\frac{p_1(\Delta\varphi_2 - \varphi_{20}) + p_2(\Delta\varphi_1 - \varphi_{10})}{p_1 + p_2} = \frac{\vartheta_{0N} p_2}{p_1 + p_2}\left(1 + s_1\left(\frac{k_\vartheta p_1 - p_2}{p_1 + p_2}\right)\right) \tag{5.155}$$

The expressions $$\Delta\varphi_{transadd1} = \vartheta_{0N}\left(1 - \frac{p_2 s_1}{p_1 + p_2}\right) + \varphi_{10} \tag{5.156}$$

$$\Delta\varphi_{transadd2} = k_\vartheta \vartheta_{0N} \frac{p_2 s_1}{p_1 + p_2} + \varphi_{20} \tag{5.157}$$

remain for the angles $\Delta_{\varphi transadd1, 2}$ which are additionally to be provided.

In systems without feedback, the terms occurring in equation 5.151 and equation 5.152 which are dependent on $\theta_{0_m}$ can be combined. This leads to $$\frac{\vartheta_{0m} p_1\left((1+k_\vartheta)\frac{p_2 s_1}{p_1+p_2} - 1\right)}{p_1 + p_2} + \vartheta_{0m}\left(1 - \frac{p_2 s_1}{p_1+p_2}\right) = \tag{5.158}$$

-continued $$\frac{p_1(\Delta\varphi_2 - \varphi_{20}) + p_2(\Delta\varphi_1 - \varphi_{10})}{p_1 + p_2}$$

and, respectively, $$\frac{-\vartheta_{0m} p_2\left((1+k_\vartheta)\frac{p_2 s_1}{p_1+p_2} - 1\right)}{p_1 + p_2} + \frac{k_\vartheta \vartheta_{0m} p_2 s_1}{p_1 + p_2} = \tag{5.159}$$

$$\frac{p_1(\Delta\varphi_2 - \varphi_{20}) + p_2(\Delta\varphi_1 - \varphi_{10})}{p_1 + p_2}$$

These expressions are—as shown in equation 5.146—independent of a rotation speed-dependent angular shift.

What is claimed is:

1. A method for operating a drive system, wherein the drive system has:
    a three-phase motor, having:
        a shaft,
        a first three-phase stator winding which is to be connected to a three-phase AC voltage grid,
        a second three-phase stator winding which is to be connected to the three-phase AC voltage grid in such a way that a second stator rotating field rotating in opposition results with respect to a first stator rotating field which is generated by the first stator winding, and
        a rotor winding system which is mechanically coupled in a rotationally fixed manner to the shaft, and
    at least one inverter which is mechanically coupled in a rotationally fixed manner to the shaft and which is electrically coupled to the rotor winding system, wherein the at least one inverter is configured to generate actuation signals for the rotor winding system, the method comprising the steps of:
    generating the actuating signals such that a first rotor rotating field and a second rotor rotating field rotating in opposition to the first rotor rotating field are generated, wherein the generating of the actuation signals for the rotor winding system solely depend on signals detected on the rotor side, wherein the signals detected on the rotor side comprise phase current signals of the rotor winding system, the phase current signals detected on the rotor side are divided by calculation into first components, which belong to the first rotor rotating field, and into second components, which belong to the second rotor rotating field, and the phase current signals which are associated with the first rotor rotating field and with the second rotor rotating field by means of the division by calculation are divided by calculation into symmetrical components with co-rotating and counter-rotating components given an asymmetrical time profile of the three-phase AC voltage grid.

2. The method as claimed in claim 1, wherein a first load angle, which belongs to the first rotor rotating field, is calculated from the divided phase current signals, a second load angle, which belongs to the second rotor rotating field, is calculated from the divided phase current signals, and an actual grid voltage angle and/or an instantaneous rotor position is/are ascertained based on the first load angle and the second load angle.

3. A method for operating a drive system, wherein the drive system has:

a three-phase motor, having:
  a shaft,
  a first three-phase stator winding which is to be connected to a three-phase AC voltage grid,
  a second three-phase stator winding which is to be connected to the three-phase AC voltage grid in such a way that a second stator rotating field rotating in opposition results with respect to a first stator rotating field which is generated by the first stator winding, and
  a rotor winding system which is mechanically coupled in a rotationally fixed manner to the shaft, and
at least one inverter which is mechanically coupled in a rotationally fixed manner to the shaft and which is electrically coupled to the rotor winding system, wherein the at least one inverter is configured to generate actuation signals for the rotor winding system, the method comprising the steps of:
  generating the actuating signals such that a first rotor rotating field and a second rotor rotating field rotating in opposition to the first rotor rotating field are generated, wherein
  the generating of the actuation signals for the rotor winding system solely depend on signals detected on the rotor side, wherein the signals detected on the rotor side comprise rotor voltages of the rotor winding system, the rotor voltages of the rotor winding system are measured in a zero-current state of the rotor winding system, wherein values of an instantaneous grid voltage amplitude, an instantaneous grid frequency, an instantaneous rotor rotation speed, and/or an instantaneous rotor position angle are ascertained based on a time profile of the rotor voltages.

4. A drive system, comprising:

a three-phase motor, comprising:
  a shaft,
  a first three-phase stator winding which is to be connected to a three-phase AC voltage grid,
  a second three-phase stator winding which is to be connected to the three-phase AC voltage grid in such a way that a second stator rotating field rotating in opposition results with respect to a first stator rotating field which is generated by the first stator winding, and
  a rotor winding system which is mechanically coupled in a rotationally fixed manner to the shaft, and
at least one inverter which is mechanically coupled in a rotationally fixed manner to the shaft and which is electrically coupled to the rotor winding system, wherein the at least one inverter is configured to generate actuation signals for the rotor winding system such that a first rotor rotating field and a second rotor rotating field rotating in opposition to the first rotor rotating field are generated, wherein the at least one inverter is configured to generate the actuation signals for the rotor winding system solely depending on signals detected on the rotor side, wherein the signals detected on the rotor side comprise phase current signals of the rotor winding system, wherein the phase current signals detected on the rotor side are divided by calculation into first components, which belong to the first rotor rotating field, and into second components, which belong to the second rotor rotating field, and wherein the phase current signals which are associated with the first rotor rotating field and with the second rotor rotating field by means of the division by calculation are divided by calculation into symmetrical components with co-rotating and counter-rotating components given an asymmetrical time profile of the three-phase AC voltage grid.

5. The drive system as claimed in claim 4, further comprising:
  a signal detection device which detects the rotor-side signals.

* * * * *